(12) United States Patent
Olsen

(10) Patent No.: US 11,805,716 B2
(45) Date of Patent: Nov. 7, 2023

(54) TILLING APPARATUS

(71) Applicant: SOIL-KEE PTY. LTD., Hallora (AU)

(72) Inventor: Niels Peter Olsen, Hallora (AU)

(73) Assignee: SOIL-KEE PTY. LTD., Victoria (AU)

(*) Notice: Subject to any disclaimer, the term of this patent is extended or adjusted under 35 U.S.C. 154(b) by 174 days.

(21) Appl. No.: 15/333,599

(22) Filed: Oct. 25, 2016

(65) Prior Publication Data

US 2017/0034984 A1 Feb. 9, 2017

Related U.S. Application Data

(60) Division of application No. 14/185,330, filed on Feb. 20, 2014, now Pat. No. 9,516,799, which is a (Continued)

(30) Foreign Application Priority Data

Sep. 5, 2011 (AU) .............................. 2011903588

(51) Int. Cl.
*A01B 33/02* (2006.01)
*A01B 49/06* (2006.01)
(Continued)

(52) U.S. Cl.
CPC ............ *A01B 33/021* (2013.01); *A01B 33/02* (2013.01); *A01B 33/103* (2013.01); (Continued)

(58) Field of Classification Search
CPC . A01B 33/00–16; A01B 49/022; A01B 49/06; A01B 49/065; A01C 5/064; A01C 7/006; A01C 7/08
See application file for complete search history.

(56) References Cited

U.S. PATENT DOCUMENTS 2,644,386 A   7/1953   Sutton
2,694,969 A   11/1954  Chattin
(Continued)

FOREIGN PATENT DOCUMENTS

AU      523208 B2    7/1982
AU    30553/95 B     9/1995
(Continued)

OTHER PUBLICATIONS

European Search Report and Opinion completed Dec. 11, 2014 pertaining to European Patent Application No. 12830633.9.

*Primary Examiner* — Jessica H Lutz
(74) *Attorney, Agent, or Firm* — Thomas E. Lees, LLC

(57) ABSTRACT

A tilling apparatus and a method of tilling soils which includes the use of a rotational shaft having a number of cutter assemblies located at spaced apart locations on the shaft in which each cutter assembly has a multitude of blades which rotate as the rotary shaft rotates to form a plurality of spaced apart trenches having the same spacing as the spacing of the cutters, and a width caused by the width of the blades. As the blades dig the trench, the soil contacted by the blades is granulated and is tossed about by the spinning blades so that some soil falls back into the trench and some falls along the periphery of the trench to form rows of aerated granules which promote enhanced growth of plants or seeds in the trench and along the edge of the trench to improve the yield of pasture having the trenches. Various attachments can be provided on the tilling apparatus, either in front of or towards the rear of the spinning blades for different purposes, such as rippers, seeders, levellers, or similar. The advantage of the tilling apparatus is that the soil is formed into granules which are used to form an aerated array of soil granules having enhanced growing properties for plants.

16 Claims, 14 Drawing Sheets

Related U.S. Application Data continuation of application No. PCT/AU2012/001048, filed on Sep. 5, 2012.

(60) Provisional application No. 61/535,555, filed on Sep. 16, 2011.

(51) Int. Cl.
*A01B 33/10* (2006.01)
*A01C 7/00* (2006.01)
*A01B 49/02* (2006.01)
*A01C 5/06* (2006.01)
*A01C 7/08* (2006.01)

(52) U.S. Cl.
CPC ............ *A01B 49/022* (2013.01); *A01B 49/06* (2013.01); *A01B 49/065* (2013.01); *A01C 5/064* (2013.01); *A01C 7/006* (2013.01); *A01C 7/08* (2013.01)

(56) References Cited

U.S. PATENT DOCUMENTS

| | | | | |
|---|---|---|---|---|
| 2,974,888 | A * | 3/1961 | Everett | A01F 29/095 |
| | | | | 172/45 |
| 3,029,879 | A | 4/1962 | Wells, Jr. | |
| 3,080,929 | A * | 3/1963 | Holmes | A01B 33/021 |
| | | | | 172/478 |
| 3,128,729 | A * | 4/1964 | Henson | A01D 42/00 |
| | | | | 111/139 |
| 3,128,831 | A * | 4/1964 | Arndt | A01B 33/021 |
| | | | | 172/123 |
| 3,194,193 | A | 7/1965 | Walters | |
| 3,347,188 | A | 10/1967 | Richey | |
| 3,348,619 | A * | 10/1967 | Reynolds | A01B 33/021 |
| | | | | 172/66 |
| 3,388,750 | A * | 6/1968 | Hamm | A01B 49/022 |
| | | | | 172/45 |
| 3,398,707 | A | 8/1968 | McClenny | |
| 3,490,541 | A | 1/1970 | Adams, Jr. | |
| 3,542,133 | A * | 11/1970 | Van Der Lely | A23L 2/60 |
| | | | | 172/112 |
| 3,661,213 | A | 5/1972 | Taylor | |
| 3,768,572 | A | 10/1973 | McCanse et al. | |
| 3,779,320 | A | 12/1973 | Cantone | |
| 3,866,552 | A | 2/1975 | Leidig | |
| 3,888,196 | A | 6/1975 | Glenn | |
| 3,970,012 | A * | 7/1976 | Jones, Sr. | A01B 21/04 |
| | | | | 111/118 |
| 3,995,570 | A * | 12/1976 | van der Lely | A01B 13/02 |
| | | | | 111/135 |
| 4,062,408 | A | 12/1977 | Enters et al. | |
| 4,276,940 | A | 7/1981 | Kirkegaard | |
| 4,360,065 | A | 11/1982 | Jenison et al. | |
| 4,365,673 | A | 12/1982 | Faulkner | |
| 4,386,661 | A | 6/1983 | McCanse et al. | |
| 4,412,587 | A * | 11/1983 | van der Lely | A01B 33/021 |
| | | | | 172/123 |
| 4,421,176 | A | 12/1983 | Tuggle et al. | |
| 4,586,444 | A | 5/1986 | Thiessen | |
| 4,619,412 | A | 10/1986 | Willingham | |
| 4,624,197 | A | 11/1986 | Drake | |
| 4,658,910 | A | 4/1987 | Garriss | |
| 4,778,012 | A * | 10/1988 | Kobashi | A01B 33/103 |
| | | | | 172/123 |
| 4,805,704 | A * | 2/1989 | Kobashi | A01B 33/082 |
| | | | | 172/123 |
| 5,048,616 | A | 9/1991 | Hoff | |
| 5,103,624 | A | 4/1992 | Marshall | |
| 5,287,934 | A * | 2/1994 | Porter | A01B 33/021 |
| | | | | 172/123 |
| 5,303,662 | A | 4/1994 | Drake | |
| 5,524,711 | A | 6/1996 | Harris | |
| 6,017,169 | A | 1/2000 | Toor et al. | |
| 6,347,593 | B1 | 2/2002 | Moran et al. | |
| 6,431,287 | B1 | 8/2002 | Ramp | |
| 7,814,984 | B1 * | 10/2010 | Fraley | A01B 33/08 |
| | | | | 172/35 |
| 7,878,260 | B2 | 2/2011 | Notaras et al. | |
| 8,181,711 | B1 | 5/2012 | Fraley et al. | |
| 2006/0070753 | A1 | 4/2006 | Lephart | |
| 2010/0139936 | A1 | 6/2010 | Notaras et al. | |
| 2011/0147019 | A1 | 6/2011 | Nusser | |
| 2014/0166320 | A1 * | 6/2014 | Olsen | A01B 33/02 |
| | | | | 172/60 |
| 2016/0029541 | A1 * | 2/2016 | Martindale | A01B 33/087 |
| | | | | 172/239 |

FOREIGN PATENT DOCUMENTS

| | | | | |
|---|---|---|---|---|
| CA | 966005 A | * | 4/1975 | ............ A01B 33/16 |
| CH | 182307 A | * | 4/1934 | |
| GB | 1 313 744 | | 8/1969 | |
| GB | 2122061 A | | 1/1984 | |
| JP | 56-081732 | | 7/1981 | |
| JP | 2003-189703 | | 7/2003 | |

* cited by examiner

TILLING APPARATUS

CROSS-REFERENCE TO RELATED APPLICATIONS

This application is a divisional of co-pending (and now allowed) U.S. patent application Ser. No. 14/185,330, filed Feb. 20, 2014 and entitled "TILLING APPARATUS", which is a continuation of PCT/AU2012/001048, filed Sep. 5, 2012, which claims priority to U.S. Provisional Application Ser. No. 61/535,555, filed Sep. 16, 2011 and AU2011903588, filed Sep. 5, 2011.

FIELD OF THE INVENTION

The present invention relates to tilling and/or renovating apparatus for use in cultivating soil and/or renovating soil.

In one form the present invention relates to a tilling apparatus for tilling, cultivating or renovating the soil to enhance the growth of both existing plants and newly sown or planted plants in the soil which has been worked upon by the apparatus.

In one form, the present invention relates to a one pass tilling system using a tilling apparatus as one part of the system so that the soil being worked upon by the tilling apparatus is renovated or rejuvenated by a single pass of the tilling apparatus.

In one form, the present invention relates to a tilling apparatus which aerates the soil in close proximity to where the soil has been tilled by the apparatus so that the tilled aerated soil promotes growth of plants occurring in close proximity to the tilled soil formed by the apparatus.

The present invention finds particular application as a tilling system having a number of different components which till, cultivate or renovate the soil so as to aerate the soil in close proximity to the tilled soil to enable plants to more readily access nutrients in order to enhance the growth of plants within the tilled soil.

Although the present invention will be described with particular reference to one or more embodiments of the present invention it is to be noted that the scope of the present invention is not limited to the described embodiments but rather the scope of the invention is more extensive so as to include other forms and arrangements of the various components of the tilling system and the use of the variable forms and arrangements of the apparatus and components of the apparatus and of the system for purposes other than specifically described.

BACKGROUND OF THE INVENTION

Compaction of soil is undesirable since the compaction of the soil inhibits growth of plants located within the compact soil. Compact soil retards the development of roots of plants already growing in the soil and prevents correct root development of newly planted plants or seeds which leads to less than optimal plant growth and thus less than expected yields of the plants growing in the compacted soil. Therefore, there is a need to reduce compaction of soils.

Compaction of soil often occurs as a result of multiple passage of farm machinery over the soil, such as for example, repeated passes of farm machinery towing individual components such as ploughs, cultivators, seeders, and the like over the same ground. The weight of the farm machinery, poor soil, grazing and fertiliser management adds to the compaction.

One of the effects of compaction of soil is that there is reduced access to nutrients and oxygen for plants grown or planted in the soil. The lack of access to oxygen and/or nutrients within the soil reduces the value of pasture or crop or the like being produced in the fields or paddocks having the compacted soil. Thus there is a need to have a system of working the land which results in less compaction of the soil.

Accordingly, it is an aim of the present invention to provide a tilling apparatus which results in less compaction of the soil.

Accordingly, it is an aim of the present invention to provide a cultivation or renovation system which requires less passes of farm machinery over the soil when being worked by providing a system and/or apparatus having multiple components.

Accordingly, it is an aim of the present invention to provide a tilling apparatus and/or a tilling system which produce improved aeration of the soil in use.

Accordingly, it is an aim of the present invention to provide a tilling apparatus and/or a tilling system which produces improved access to nutrients within the soil and enhances geological epimorphism and soil mineral hydrolysis.

SUMMARY OF THE INVENTION

According to one form of the present invention there is provided a cutter for a tilling apparatus suitable for working soil, said cutter comprising a first part capable of being fixedly connected to a part of the tilling apparatus so as to allow the cutter to rotate in use, and a second part capable of working the soil in use to form a worked portion of soil, in which one dimension of the worked portion of soil corresponds to one dimension of the second part of the cutter, the second part being located at or towards one end of the first part to extend from the first part on one or on both sides of the first part for contacting the soil, wherein rotary movement of the first part of the cutter causes corresponding rotary movement of the second part of the cutter such that when the second part of the cutter contacts the soil is granulated to form soil particles, wherein a first part of the granulated soil forms a layer of soil particles interspersed with cavities and voids to form an aerated array of soil particles within the worked portion of the soil and a second part of the granulated soil is deposited to at least one side of the portion of worked soil formed by the action of the cutter such that the first part and the second part of the granulated soil provides enhanced growth of plants in the worked portion of the soil.

According to one form of the present invention there is provided a cutting assembly for forming a portion of worked earth or soil, said cutting assembly including a multitude of cutters mounted for simultaneous rotation wherein each cutter comprises a first part which is fixedly connected to the cutting assembly to rotate in use, and a second part which is capable of working soil to form a worked portion of soil having a dimension which corresponds to one dimension of the second part of the cutter, the second part of the cutter being located at or towards one end of the first part to extend from the first part on at least one side of the first part for contacting the soil wherein rotary movement of the first part of the cutter causes corresponding rotary movement of the second part of the cutter such that when the second part of the cutter contacts the soil, the soil is granulated to form soil particles wherein a first part of the granulated soil forms a layer of soil particles interspersed with cavities and voids to form an aerated array of soil particles within the worked portion of the soil and a second part of the granulated soil is deposited to at least one side of the worked portion of soil formed by the action of the cutter such that the first part and the second part of the granulated soil provides enhanced growth of plants in the worked portion of soil.

According to one form of the present invention there is provided a tilling apparatus comprising a cutting assembly having a multitude of individual cutters mounted for rotation about a rotary shaft in groups at spaced apart locations along the length of the rotary shaft to form a multitude of spaced apart rows of worked earth or soil wherein the cutter comprises a first part fixedly connected to the tilling apparatus so as to rotate in use, and a second part for contacting soil to form a worked portion of soil which has one dimension corresponding to one dimension of the second part of the cutter, the second part of the cutter being located at or towards one end of the first part of the cutter to extend from the first part on at least one side of the first part of the cutter for contacting the soil wherein rotary movement of the first part of the cutter causes corresponding rotary movement of the second part of the cutter such that when the second part of the cutter contacts the soil, the soil is granulated to form soil particles wherein a first part of the granulated soil forms a layer of soil particles interspersed with cavities and voids to form an aerated array of soil particles within the worked portion of soil and a second part of the granulated soil is deposited to at least one side of the worked portion of soil formed by the action of the cutter such that the first part and the second part of granulated soil provides enhanced growth of plants in the worked portion of soil.

According to one form of the present invention, there is provided a method of cultivating soil to increase the productivity of soil when cultivated comprising the steps of using a tilling apparatus having a multitude of rotatable cutters to form rows of spaced apart cultivated soil by travelling over the soil, wherein the rotating cutter comprises a shank capable of being fixedly connected to the tilling apparatus so as to allow rotary movement of the cutter, and a blade capable of contacting soil to be worked to form a worked row of soil, in which the width of the row is about at least as wide as the length of the blade, the blade being located at or towards one end of the shank to extend substantially perpendicularly from the shank to one or both sides of the shank for contact with the soil, wherein rotary movement of the shank of the cutter causes corresponding rotary movement of the blade of the cutter such that the action of the blade on contacting the soil causes granulation of the soil to form substantially discrete soil particles in which a first part of the granulated soil forms a layer of soil particles interspersed with cavities and voids to form an aerated array of soil particles within the row of worked soil and a second part of the granulated soil is deposited to the side or sides of the row being formed by the action of the cutter so as to extend along the row, said first part and second part of the granulated soil providing enhanced growth of plants along the sides of the row and within the row.

According to one form of the present invention there is provided an apparatus for tilling soil by forming at least two spaced apart rows of worked soil comprising a frame for supporting a rotatable shaft capable of being driven in rotary motion, a multitude of discs fixedly mounted to the shaft at spaced apart locations along the length of the shaft for rotation with the shaft, each disc having a multitude of tines fixedly mounted to the disc so that part of the tine extends outwardly from the plane of the disc wherein rotation of the shaft causes movement of the tines to form a row of worked soil, such that the action of the tines on the soil causes granulation of the soil within the row of worked soil to form substantially discrete particles of soil wherein a first part of the granulated soil forms a layer of soil particles intermixed with cavities or voids to form an aerated array of soil particles within the row and a second part of the granulated soil is deposited to the side or sides of the row formed by the action of the tines to extend along the edge of the row to provide for enhanced growth of plants along the edge of the row and within the row.

BRIEF DESCRIPTION OF THE EMBODIMENTS

Typically, the tilling apparatus is a renovator, cultivator, plough, tilling device, renovator/planter, renovator/seeder, renovator/smudger or similar for cutting and working the soil to break up the soil to form small size particles of soil such as pieces, clumps, granules, aggregates or the like by repeatedly working the soil, particularly the particles of soil cut from the earth during working of the soil in a one pass operation. It is to be noted that the term, tilling apparatus, is not to be restricted to tilling devices but also includes other similar devices for working the soil and the like, including any device for comminuting the soil into pieces of a size allowing aeration of the soil to take place, and includes combinations of operations such as levelling the soil with a leveller, or smudging or smoothing the soil after cutting or planting or the like.

Typically, the portion of worked soil is a piece, tract, section, stretch or similar of land containing soil which has been treated or worked by the various form of the tilling apparatus. More typically, the portion of worked soil is in rows which are arranged as substantially parallel spaced apart rows corresponding to the width of the working implements of the tilling apparatus.

Typically, the implement for working and/or cutting the soil is a cutter or cutting device or similar for cutting, slicing, tearing, or similar, the soil to aerate the soil. The implement can take any suitable, convenient or applicable form for forming the rows of worked soil and/or granules of worked soil, particles of soil or the like.

In one form, the cutter is provided with a blade. Typically, the blade of the cutter is a cutting blade, plough blade or similar for comminuting the soil into particles. In one form, each cutter has a single blade or each cutter has two or more blades. In one form, the blade extends from the one side of the cutter, whereas in other forms, the blades extend from both sides, and where the cutter has two blades, the blades extend from both sides of the cutter, such as for example, the blade is a substantially T-piece blade which can cut the soil on both sides of the cutter to form the row or trench.

In one form, the row of worked soil is or includes, a groove, trench, channel, furrow, concavity, rut, score, slot, ditch, trough, dip, hollow, depression, seedbed or the like.

In one form, the trench or furrow includes an edge of the trench or furrow or the like including an apron, verge, brink, brow, brim, margin, border, rim, skirt or the like.

DESCRIPTION OF THE DRAWINGS

One example of one form of a tilling apparatus will now be described with reference to the accompanying drawings in which:

FIG. 10A is an enlarged view of one form of the distributor of the seeder for distributing seed into the various chutes of the seeder shown in FIG. 10.

FIG. 14a is an enlarged perspective view of the form of the leveller of FIG. 14.

DETAILED DESCRIPTION

Figure 1:
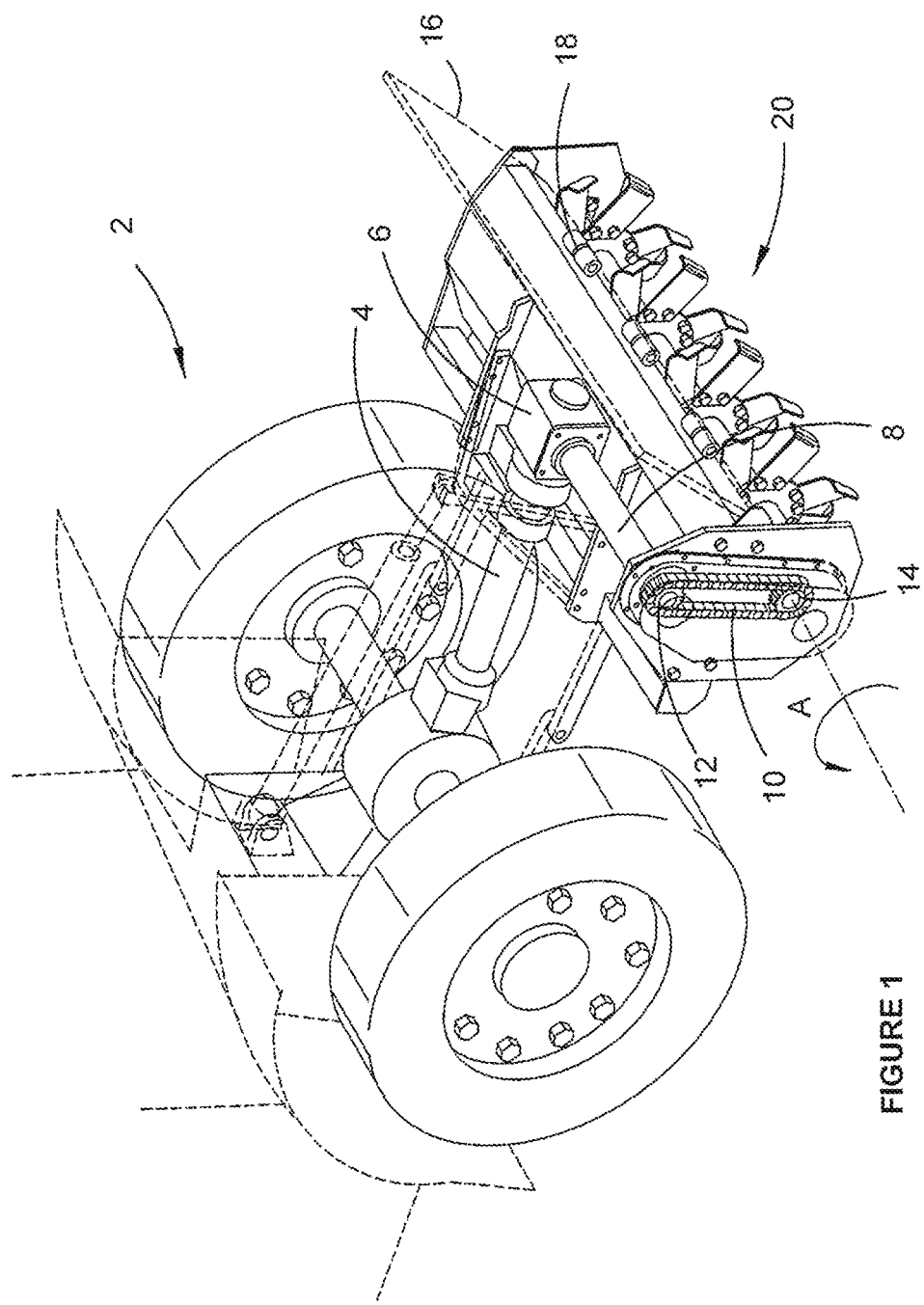
FIG. 1 is a rear side perspective view from above of one form of the tilling apparatus connected to a tractor showing the tilling apparatus in situ connected to a power take off shaft for driving the tilling apparatus.
Figure 2:
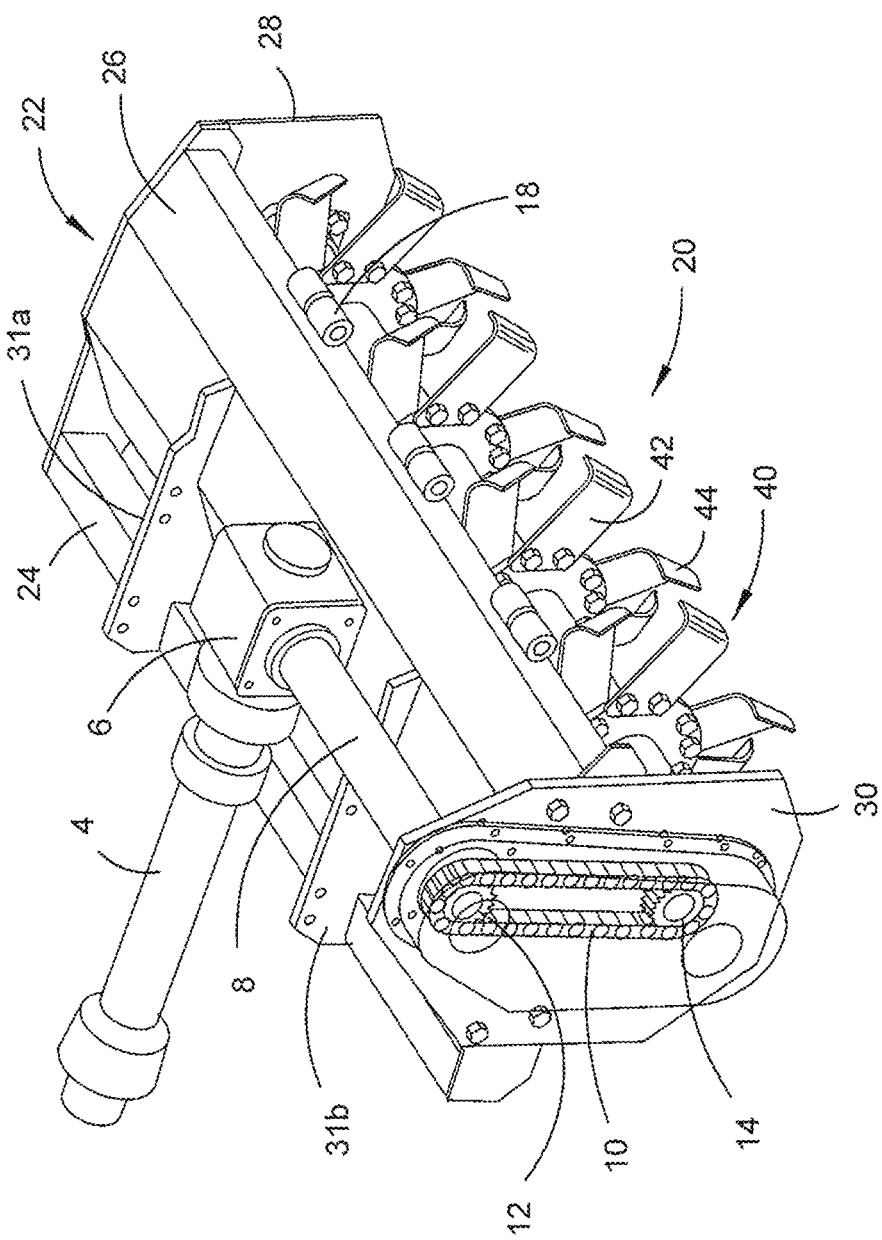
FIG. 2 is a rear side perspective view of the form of the tilling apparatus of FIG. 1 in isolation showing one form of the cutters.
Figure 3:
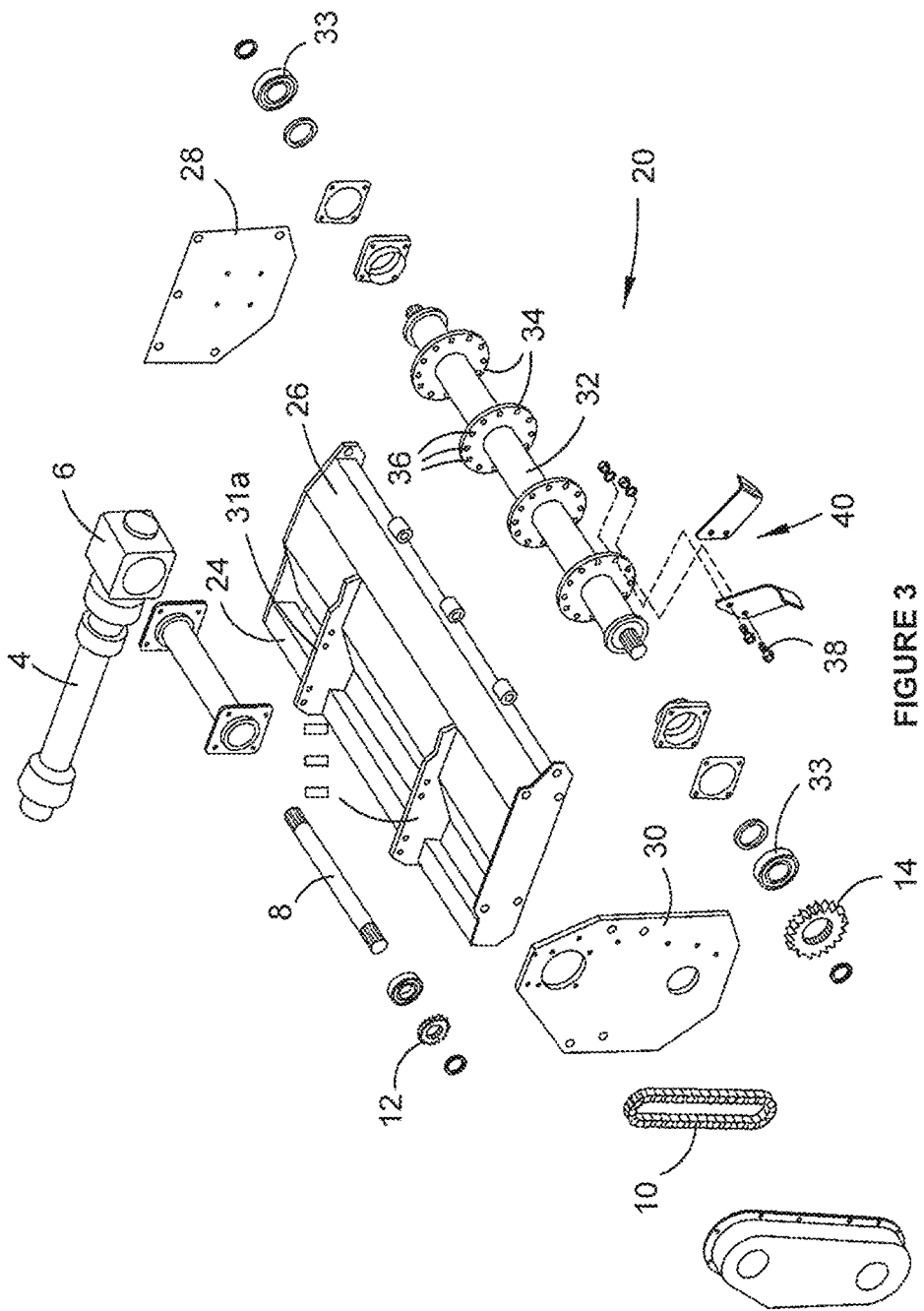
FIG. 3 is an exploded view of the form of the tilling apparatus shown in FIGS. 1 and 2.
Figure 4:
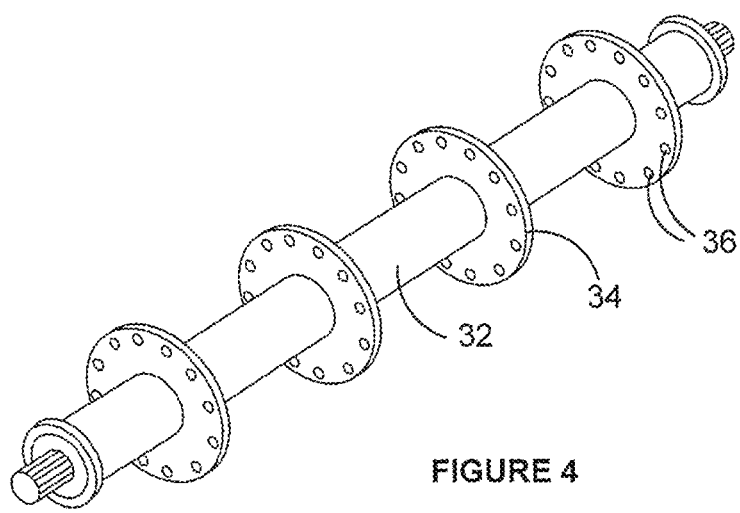
FIG. 4 is a side perspective view of one form of the rotary shaft of the tilling apparatus of FIG. 1 without attached cutters.

One form of a tilling apparatus and/or tilling system will now be described with reference to the accompanying drawings.

In one form, tractor 2, typically of a conventional configuration for general farm work, is provided with a power takeoff arrangement, including a power takeoff shaft 4 for driving a tilling apparatus, generally denoted as 20, through a suitable gearbox 6 and transmission, including a shaft 8 and chain 10. Chain 10 is engaged around an upper gear wheel 12 and a lower gear wheel 14. It is to be noted that any suitable power takeoff shaft, gearbox, transmission or components thereof or any motive arrangement or power may be used for driving tilling apparatus 20 in whatever form the tilling apparatus takes, such as for example, the transmission can include a set of gears in meshed relationship for transmitting power to the tilling apparatus . The power source and transmission is illustrative of the manner of driving tilling apparatus 20.

Tilling apparatus 20 includes a main framework arrangement 22 comprising, in one form, two transversely extending front and rear frame members 24,26 and two longitudinally extending side frame plates 28,30 interconnecting both of the two transverse front and rear members 24, 26 to form the generally rectangular rigid framework arrangement 22 to which the other components of tilling apparatus 20 may be mounted or connected as will be described in more detail below. A pair of inboard longitudinally extending braces 31a, b are provided to extend between transverse framework members 24,26 inboard of side plates 28,30 to provide increased strength and rigidly to framework arrangement 22. As shown in phantom in FIG. 1, movable flap 16 is hingedly connected to transverse framework member 26 by hinges 18 which are located at spaced apart locations along the length of rear transverse member 26. Flap 16 is movable between a raised position as shown in phantom in FIG. 1 and a lowered position as shown in phantom in FIG. 10.

Figure 6:
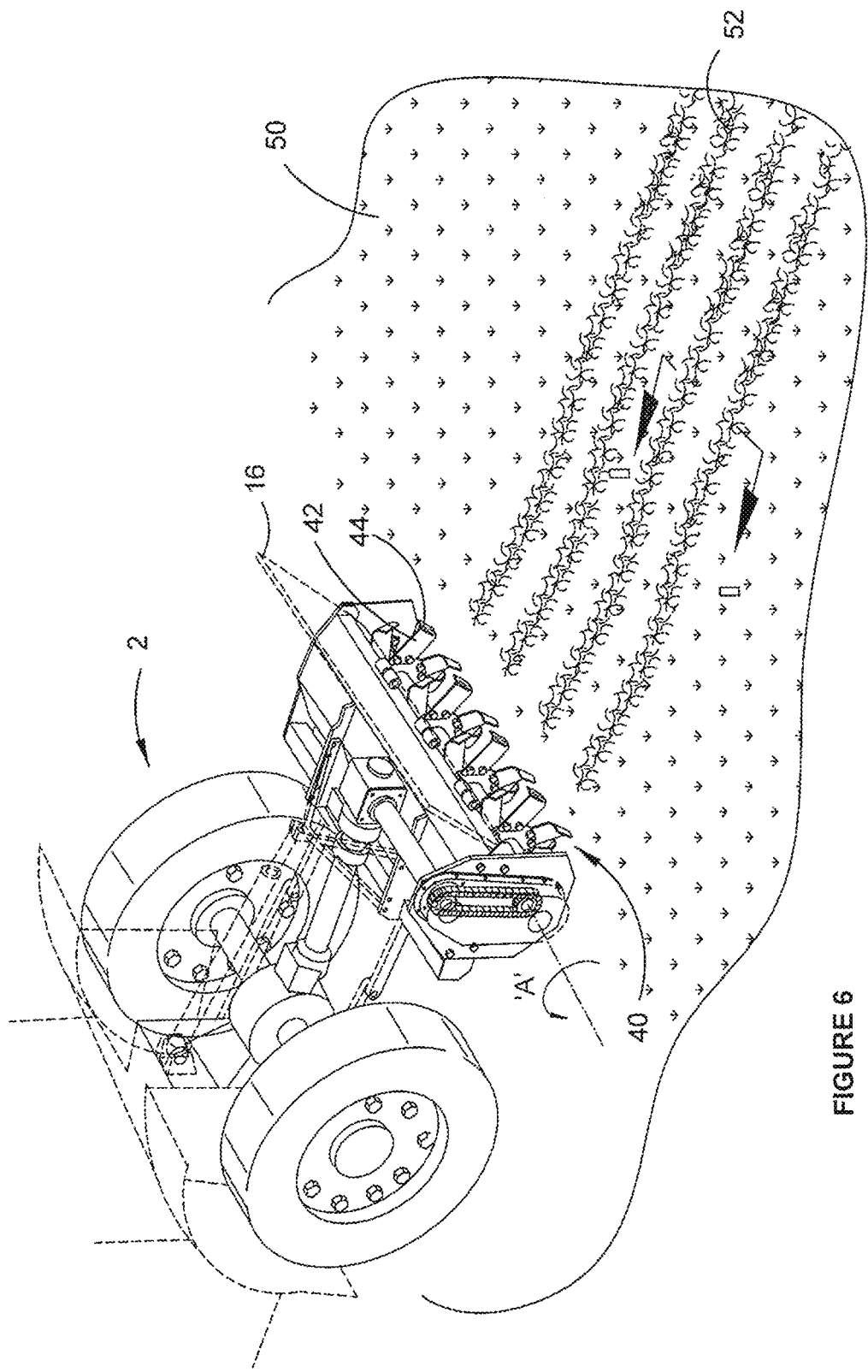
FIG. 6 is a top perspective schematic view of one form of the rows being formed by the tilling apparatus when towed by a tractor.
Figure 10:
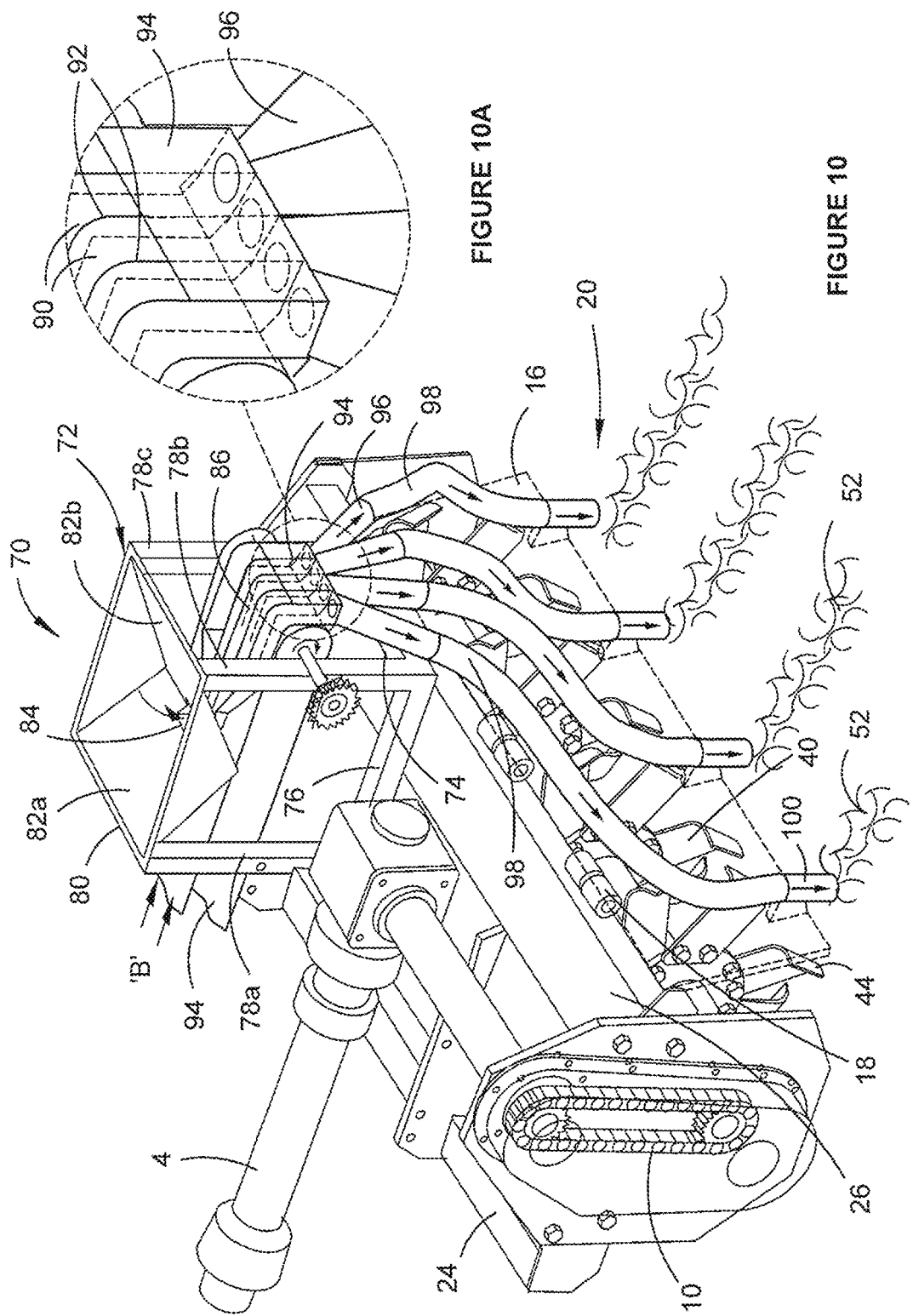
FIG. 10 is a rear perspective view of another embodiment of the tilling apparatus showing a seeder and related hardware mounted to the rear of the tilling apparatus for conveying seeds for planting into the rows formed by passage of the tilling apparatus over the surface of the soil.

In usual operation of tilling apparatus 20, flap 16 is in the lowered position allowing rotational operation of apparatus 20. When flap 16 is in the raised position as shown in FIGS. 1 and 6, less of the particles of soil being granulated by the cutters fall back into the trench and when flap 16 is in the lowered position as shown in FIG. 10, more of the particles of soil fall into the trench. Also, when flap 16 is in the lowered position, flap 16 acts on the particles of soil to assist in breaking up any clumps of soil and/or to spread the particles more evenly over the sides of the row and in the trench. In this position, flap 16 acts like a smoother or smudger to spread and/or level the soil particles evenly over the width of the tilling apparatus.

When flap 16 is in the raised position, rotation of the tilling apparatus allows the soil to be granulated into small substantially spherical pieces or the like and thrown from the apparatus. In this configuration, the flap assists in deflecting the granules into the trench or to the side of the trench as the particles are being raised by the rotary action of the tilling apparatus as will be described in more detail later in this specification.

When flap 16 is in the lowered position, as the tilling apparatus 20 travels over the surface of the soil, the granules of soil on the surface are redistributed by the action of the flap being dragged through the granules which has a tendency to spread the granulated soil particles over the seeds, both to the sides of the trench and in the trench, to cover the seeds in order to promote germination of the seeds and other germination development of the roots of the plant and growth of the plant.

Optionally, apparatus 20 is provided with guides or shrouds connected to the rear of apparatus 20 for providing a permanent fitting to deflect said particles back onto the ground into the trench and sides of the trench. In one form, the shroud is a one piece construction whereas in other forms, the shroud is a two piece constructions.

In one form, the shroud is provided with a generally T-shaped cut-out or aperture through which the shank and blade of a cutter can pass when rotating. In one form, shroud takes the place of flap 16 to retain and/or deflect soil particles being thrown up by the rotation of the cutters. It is to be noted that the shroud or housing at the rear of the tilling apparatus can have any suitable or convenient shape or arrangement.

Returning now to the description of the tilling apparatus, rotary shaft 32 is journalled in bearings 33 located within suitable housings at or towards either transverse side of apparatus 20, such as for example on or near to side plates 28, 30 for mounting rotary shaft 32 for rotation during use of tilling apparatus 20. One end of rotary shaft 32 is connected to lower gear wheel 14 permitting rotation of rotary shaft 32 in the direction of arrow A of FIG. 1 in use of tilling apparatus 20. Although the rotation is in the direction of arrow A of FIG. 1, it is to be noted that the direction of rotation can be either direction, i.e. in direction A or in the opposite direction.

Shaft 32 is provided with a multitude of rotary discs 34 fixedly connected to shaft 32 located at regularly spaced apart locations on shaft 32. Each rotary disc 34 is provided with a multitude of spaced apart apertures 36 located circumferentially around the edge of disc 34. In one form, there are four rotary discs 34 located at 500 mm centres on shaft 32. However, it is to be noted that any number of discs 34 can be provided on shaft 32 depending upon the width of tilling apparatus 20 and the length of shaft 32, and the amount of working required of the soil and the nature and type of the soil to be cultivated. Additionally, the spacing between adjacent discs 34 can be any suitable spacing to suit requirements. Further, it is to be noted that in some embodiments, rotary discs 34 can be replaced with any suitable connector or the like for connecting the cutters to the tilling apparatus.

The distance between adjacent discs 34 can be any suitable spacing, such as for example, between from about 200 mm to about 2000 mm, with a typical spacing being about 500 mm. Additionally, the diameter of disc 34 can extend from being about 200 mm to about 4000 mm with diameters typically being in the range of from about 250 mm to 3000 mm and preferably from about 300 mm to about 2000 mm. Typically, the diameter of the disc is from about 400 mm to 2000 mm depending upon the depth of cut of the trench required when cultivating the soil using tilling apparatus 20 as will be described in more detail later in this specification.

In one form, a multitude of cutters in the form of tines 40, are fixedly connected to each rotary disc 34 such as for example by bolts 38 received through apertures 36 located around the periphery of each disc 34 at or towards the circumference of each disc as shown in the drawings, particularly FIGS. 1, 2, 3 and 4.

It is to be noted that the number of separate tines 40 connected or mounted on each disc 34 can vary from about 2 to about 60 depending upon the size of disc 34 and the types of soil being worked, as well as the size, shape or type of tine being used as well as the size of the trench being formed. However, depending upon the diameter of the disc 34, the number of individual tines is typically from about 4 to about 12, with 6 being typically the preferred number of tines as illustrated in the drawings. In one embodiment of tilling apparatus 20, tines 40 can be connected directly to shaft 32 or any other form of suitable intermediate connector can be used between rotary shaft 32 and tines 40 to mount the tines.

In one form, tines 40 are generally of an L-shaped configuration having a connecting shank 42 which is substantially straight or planar and a blade 44 which is arranged to extend transversely of the plane of shank 42, such as for example, preferably to extend substantially perpendicularly from connecting shank 42 as illustrated in the drawings. However, tines 40 can have any suitable or convenient shape. One other possible shape is that other forms of tines 40 can be generally T-shaped in which the blades extend substantially perpendicularly outwardly from the shank on both sides of the plane of the shank. In other forms, the cutters can be of either type attached to rotary disc 34 so that the apparatus has a combination of different types or orientations of tines.

Other forms of the blades include straight blades having a cutting surface or edge located at one end, i.e. the distal end and/or along one side edge, i.e. the leading edge when rotating. In one form, the blade is a spike or similar having a substantially straight shaft extending radially from rotating shaft 32 and/or disc 34 provided with a sharpened end in the form of a point or the like.

In another form, the blade is a curved blade, typically curved in the lengthwise extending direction or in the direction transverse to the longitudinal axis or both.

In another form, the blade is a twisted or bent blade having a cutting surface, edge or end out of the plane of the blade in a manner similar to the blade of a lawn mower or similar cutting tool. In another form, the blade is twisted out of the plane of the blade in the lengthwise extending direction so that the cutting surface, edge or end is arranged to extend transversely to the plane of the shaft of the blade.

Figure 5:
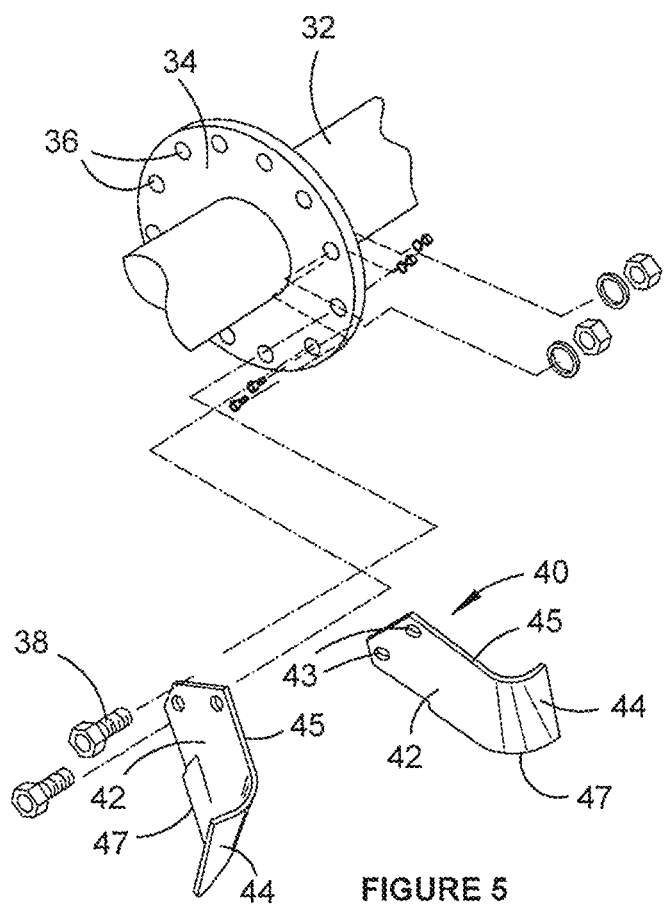
FIG. 5 is an exploded view of one form of the manner in which two oppositely directed cutters are mounted to one disc of the rotary shaft.

Shank 42 is provided with a pair of spaced apart apertures 43 for receiving bolts 38 therethrough to attach tines 40 to discs 34 as shown more particularly in FIG. 5. In one form, tine 40 is of a generally rectangular or trapezium-like shape having two substantially parallel straight sides, one side at right angles to the two parallel sides and one side being angularly inclined to both parallel sides, as shown in the drawings. One lengthwise extending edge of shank 42 which is the cutting edge 47, is substantially straight, whereas the other edge of shank 42 being the tailing edge 45 is also substantially straight so that shank 42 has a generally quadrilateral shape. However, any suitable or functional shape is possible, such as curved blades, truncated blades, trapezium-like blades or the like, including blades having straight cutting edges, twisted cutting edges, serrated cutting edges, or having curved cutting edges. Blade 44 is typically of a truncated form and extends for about 70 mm from shank 42. However, the end of the tine can have any length or width as required as well as having any orientation or shape. It is to be noted that the purpose of tine 40 is to cut, chop or otherwise disturb the soil and reduce the soil to granules or other smaller sized particles, i.e. to comminute the soil so as to allow aeration of the soil or the like when the soil particles collect in the trench or to the sides of the trench.

It is also to be noted that the position, location or orientation of the blades is such that there are overlapping cuts from two adjacent blades 44 on the one side or on both sides of shank 42 to further work the soil being cut to form granulated particles of soil.

In one form, blades 44 of adjacent tines 40 are arranged to extend in alternately opposite directions to one another so as to be capable of forming a row or trench of cut earth or soil having a width which is about twice the length of the blade 44 located at the end of tine 40 in use of tilling apparatus 20. In one form (not shown), the width of the trench being formed by the tilling apparatus is twice the length of blade 44 plus the width of disc 34 shown more particularly in FIG. 7.

Figure 17:
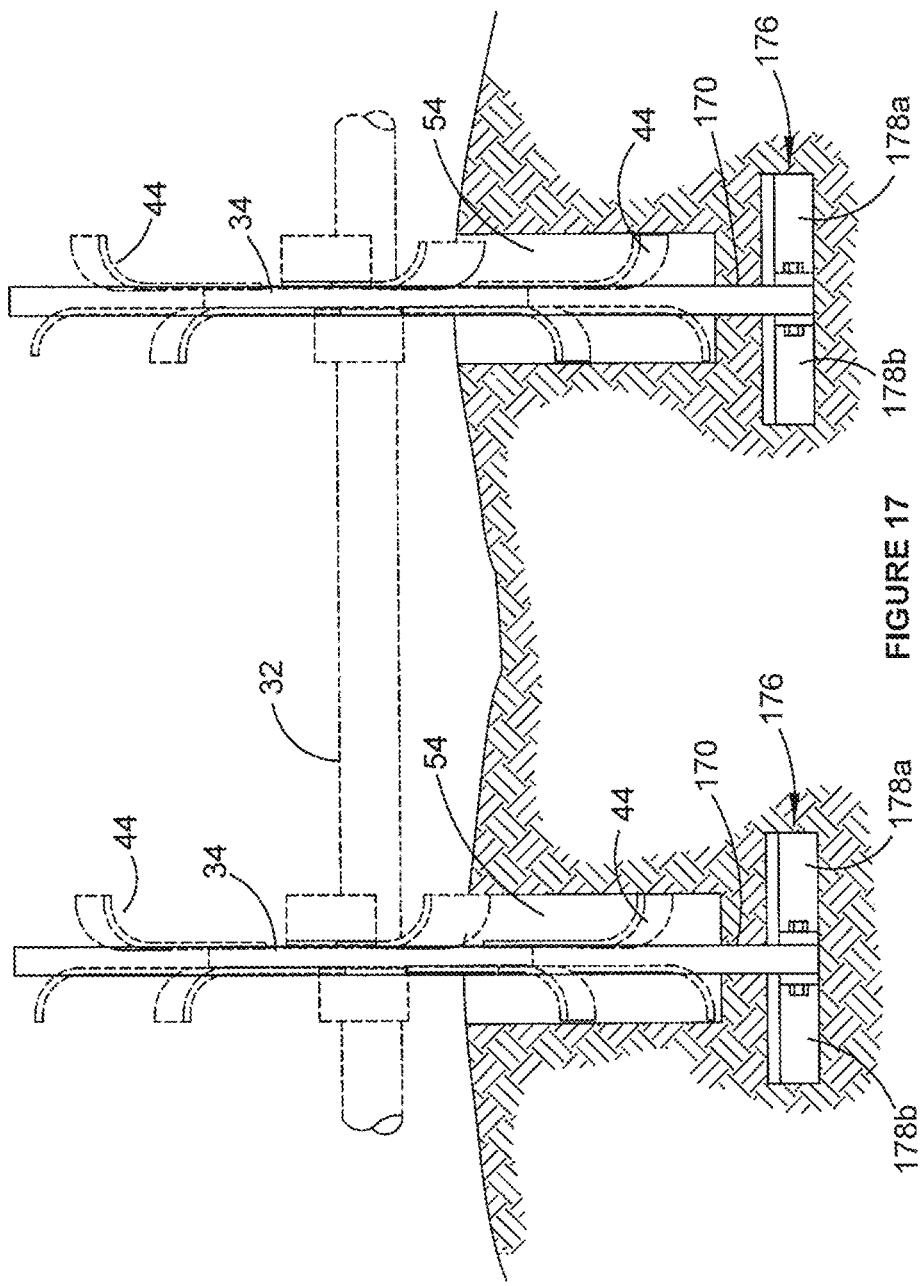
FIG. 17 is a schematic end cross-sectional view of the formation of rows using a further embodiment of the tilling apparatus having a protective shear.
Figure 18:
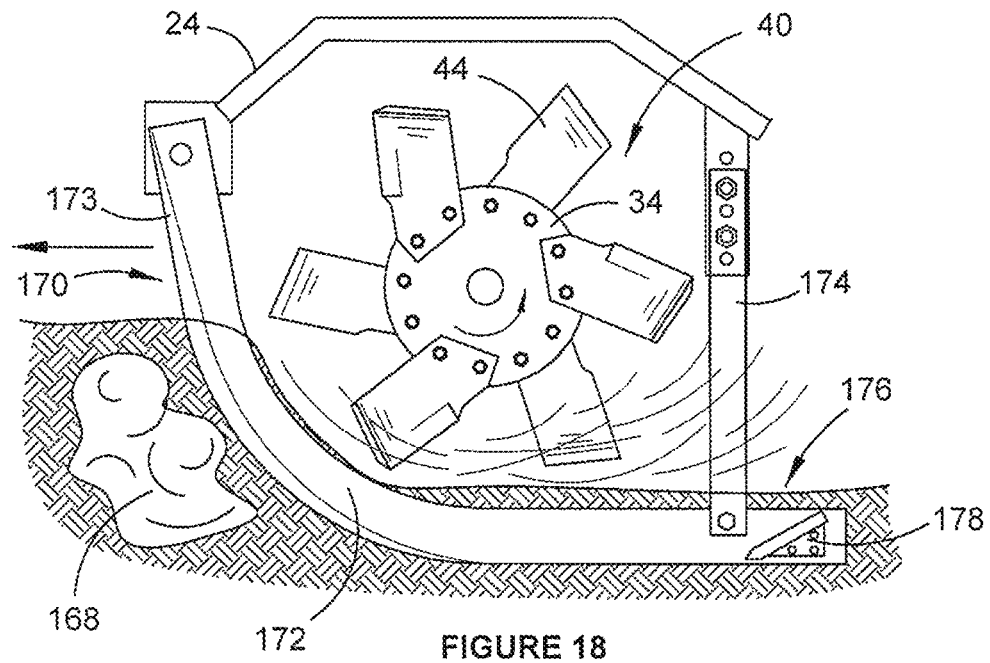
FIG. 18 is a side cross-sectional view of the form of the tilling apparatus of FIG. 17 having the protective shear prior to contacting a solid foreign object.
Figure 19:
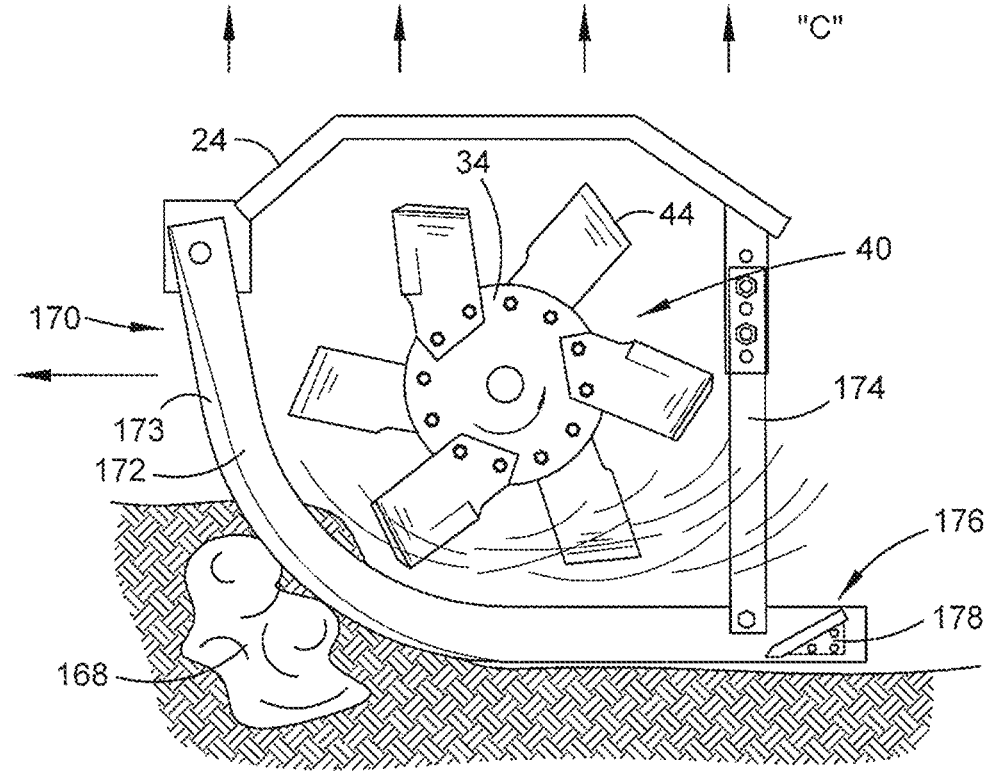
FIG. 19 is a side cross-sectional view of the form of the tilling apparatus of FIG. 17 having the protective shear after contacting the solid foreign object.

In one form, tine 40 is connected to disc 34 by a suitable connector in the form of a fastener. In one form, the suitable fastener includes a main bolt of a size and strength to fixedly connect tine 40 to disc 34, such as for example, of a size and strength comparable to bolt 38, and a second part of the fastener, which in one form is a shear bolt (not shown), which is received through aligned apertures of shank 42 of tine 40 and apertures 36 of disc 34. The shear bolt is of a size and type that ruptures when subjected to a force or impact greater than a threshold amount of force or impact. During operation, if tine 40 contacts a foreign object such as for example, a hard object or immovable object, such as for example a rock embedded under the surface of the soil being worked, the force or impact of blade 44 contacting the rock causes the shear bolt to break, allowing tine 40 to pivot about the main bolt so that blade 44 can swing out of contact with the rock and the tilling apparatus can continue operating, thereby preventing unnecessary damage to tine 40, disc 34 or tilling apparatus 20. When convenient, a replacement shear bolt can be inserted through the aligned apertures of tine 40 and disc 34 to fully reattach tine 40 to disc 34 so that tilling apparatus 20 is ready for further work once again. However, it is to be noted that other forms of arrangements for preventing damage to the tilling apparatus and/or to deflect the tilling apparatus away from the solid foreign object. One such arrangement is shown in FIGS. 17 to 19 which will be described later in this specification.

Operation of tilling apparatus 20 and the tilling system involving the use of tilling apparatus 20 will now be described.

In operation, rotation of power takeoff shaft 4 causes rotation of discs 34 and tines 40 to enable blades 44 to cut a trench or row as will now be described in more detail with particular reference to FIGS. 6 to 9. Typically, the speed of rotation of shaft 32 is from just above zero to about 2000 rpm, usually in the range of about 50 to 400 rpm and preferably in the range of about 100 to 300 rpm.

With particular reference to FIG. 6, as tractor 2 travels along the surface of soil 50, such as for example, traversing a paddock, field, or other tract of land, tines 40 are caused to rotate typically in the direction of arrow A of FIG. 1, so that blades 44 cut the soil to form four substantially parallel rows 52 of worked earth or worked soil caused by the rotation of blades 44 at the respective ends of tines 40 cutting through the earth in order to till or otherwise cultivate the soil to form rows 52. It is to be noted that in this configuration, flap 16 is in a partially raised position as shown in phantom in FIG. 6.

In forming rows 52, the soil in the immediate vicinity of tines 40 is granulated to form small lumps or particles of soil of typically, a generally spherical shape which can be loosely stacked or packed with each other to form a well ventilated or aerated array of spherical lumps or particles of soil within trench 54 as trench 54 is being formed within row 52.

Figure 7:
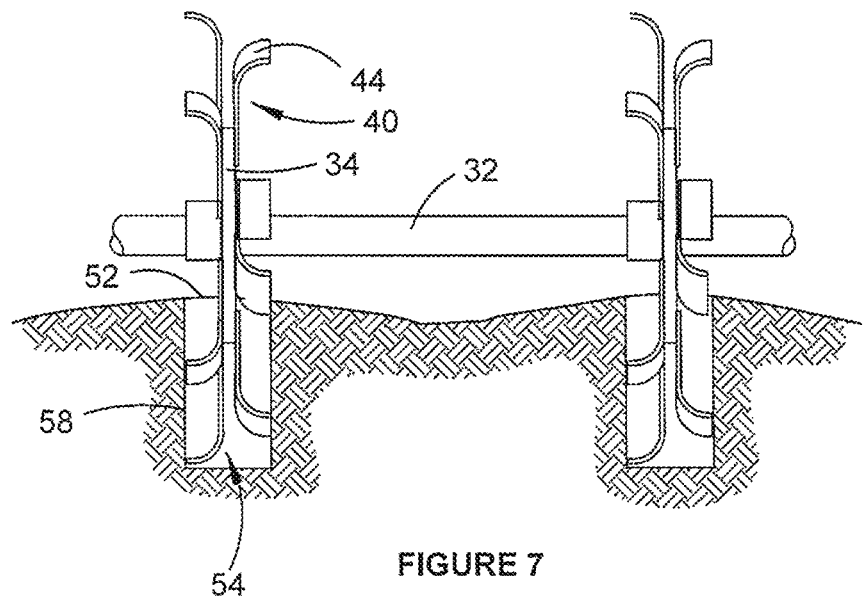
FIG. 7 is a schematic cross-sectional view showing the relationship between the cutters and the unworked soil after the formation of the rows by the passage of the tilling apparatus.

The formation of trench 54 will now be described with particular reference to FIGS. 7 to 9.

As tractor 2 travels over the surface of the earth or land 50, tines 40 rotate to form trenches 54 which is the central longitudinally extending part of row 52. Trench 54 has a width in accordance with the length of blade 44 or blades 44 of tine 40, as shown more particularly in FIG. 7. In particular, the width of trench 54 is about or slightly greater than twice the length of blade 44. In addition to forming trench 54, blades 44 impact the soil within trench 54 to work the soil within the trench so as to form small soil granules 60 by the repeated cutting action of blades 44 against the soil in the trench as blades 44 rotate within trench 54. It is to be noted that the speed of rotation of shaft 32 is very much greater than the speed of travel of tractor 2, and hence tilling apparatus 20, over land 50 so that there are repeated cuts of substantially the same soil by blades 44.

Soil granules 60 are moved around within trench 54 in a manner such that some of the granules are lifted out of trench 54 by the rotary action of blades 44 contacting the undersurface of the granules which are deposited at or along the longitudinally extending side edges 56 of trench 54 so as to form a layer of granulated soil 57 along the periphery, rim or apron of the trench, and other of the granules 60 are lifted and tumbled over one another within trench 54 by blades 44 so as to fall back into trench 54 so as to remain within trench 54 to form an aerated array or stack of granules 59 in trench 54. In one form, it is noted that the granules from the top soil and subsoil are mixed which allows water infiltration and retention which results in increased oxygen detoxification of gas build up in the soil.

It is to be noted that some of soil granules 60 are not lifted fully out of the trench but rather fall back into the trench so as to remain in the trench to form an array or assemblage 59 of granules or particles 60. However, granules 60 remaining in trench 54 are not hard packed or clumped together within the trench, but are loosely arranged within the trench in a stacked array with voids, cavities or the like 61, formed between them so as to form an aerated mixture of granules 60, and cavities 61, or voids allowing air to access the interior of the trench and allowing seeds deposited in the trench to germinate and grow within the trench by having access to nutrients in the granules and soil within the trench more easily than if the soil was compacted or packed. Also, it is to be noted that seeds planted simultaneously with cutting and spreading the soil particles within and to either side of the trench, are also provided with an enhanced chance of flourishing and growing after germination without competition from other plants until the root systems of the plants develop from the recently planted seeds are well established.

It is to be noted that typically, about 50% of the soil remains in the trench in the form of granules and about 50% of the granules are lifted from the trench and deposited on one or both sides, typically on either side, of the trench to a distance of up to about 300 mm from the edge of the trench on both sides of the trench because of the arrangement of blades 44 extending in opposite directions alternately to each other to form an aerated layer of granules 56 on the surface of the soil which provides suitable conditions for increased or improved growth of plants along the sides, edges or aprons of rows 52 formed by tilling apparatus 20 and/or suitable conditions for colonisation by beneficial insects, soil biota, or the like, such as for example soil organisms, worms or similar, which further improves the health and development of plants either growing in the vicinity of the rows, such as along the layer of granules 56, or about to be planted within trench 54.

Figure 8:
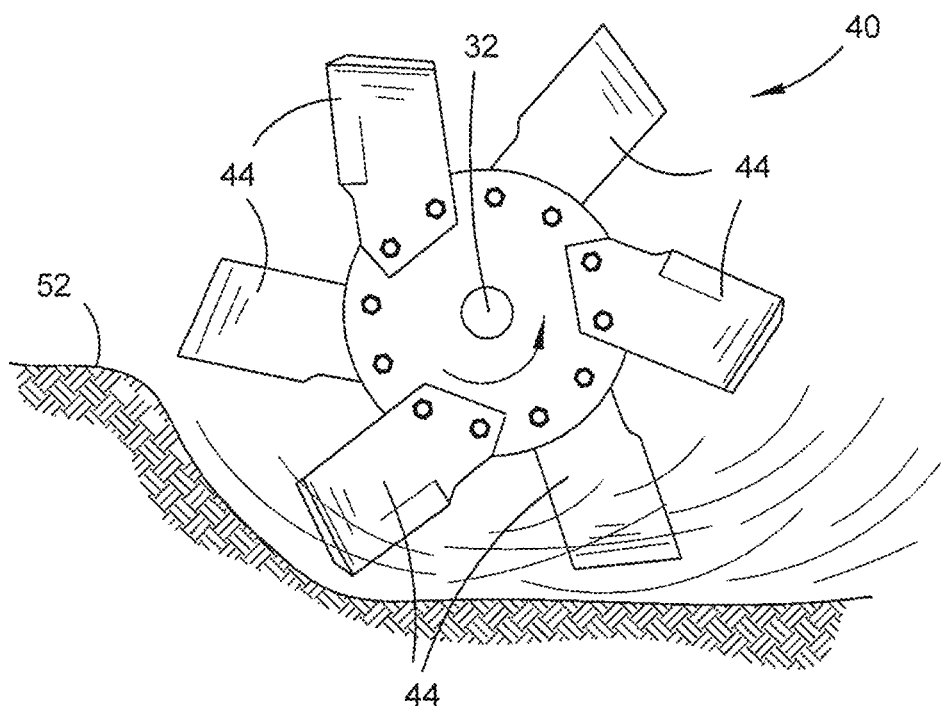
FIG. 8 is a cross-sectional view showing the direction of rotation of the cutters during operation of the tilling apparatus to work the soil so as to cut a trench and to granulate and lift the soil as the trench is being cut.
Figure 9:
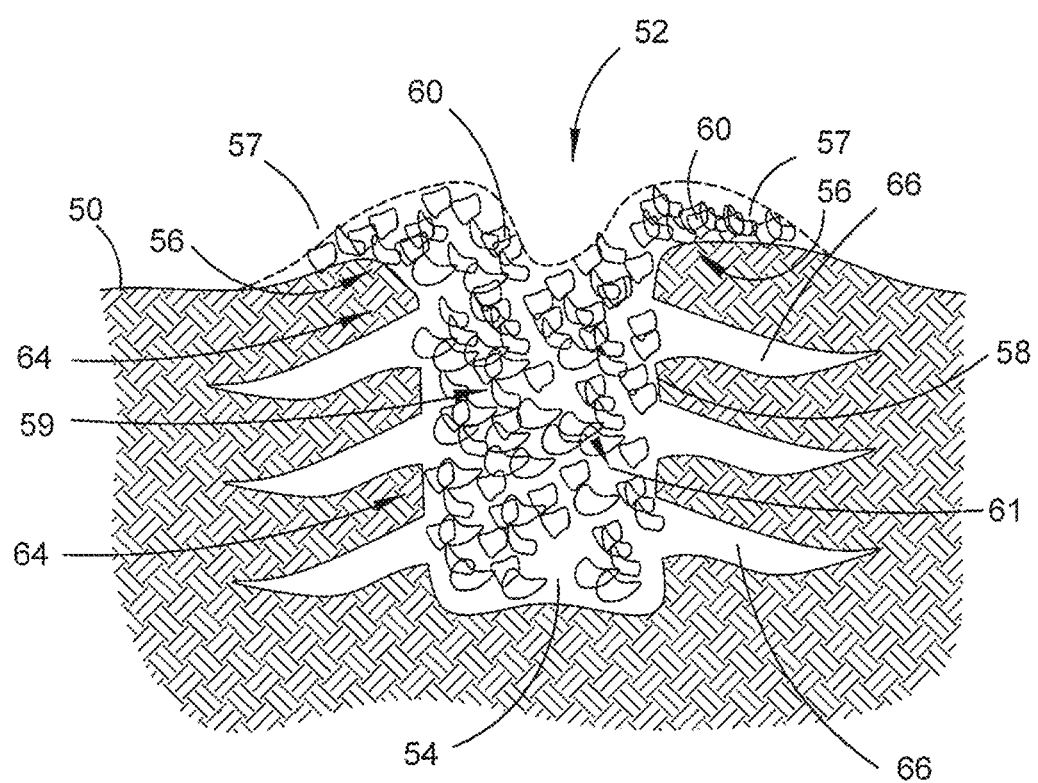
FIG. 9 is a schematic cross-sectional view of a stylised trench containing soil formed after passage of the tilling apparatus showing the structure of the soil including the trench and fissures in the side walls of the trench so as to aerate the soil.

Simultaneously with the formation of granules 60 from the soil within the trench, the rotary action of blades 44 lifts the soil in the immediate vicinity of the side walls 58 of trench 54 as illustrated schematically in FIG. 8, so as to separate the side walls of the trench into segments 64 by forming a multitude of cracks, fissures or other elongate cavities 66 in the strata of soil at and/or towards either edge 58, or side wall of the trench. Thus, rotary action of the blades of the tines within the trench not only granulates the soil within the trench but also lifts and separates the soil in segmented layers 64 to form fissures or cracks 66 alternately with layers of soil at the sides of the trench. Although any number of cracks or fissures can be formed within the sidewalls of the trench, typically, about three or four separate cracks or fissures 66 are formed in either sidewall of the trench, depending upon factors, such as for example, the diameter of disc 34, the length of shank 42, the length, orientation and number of blades 44 and the like, including the type of soil and the condition of the soil, atmospheric condition and the like. Cracks or fissures 66 allow air to penetrate the strata of soil to increase the aeration of the soil. Typically, each crack or fissure extends up to about 150 mm from the edge of the trench and to a height of up to about 6 mm. Further, it is to be noted that each fissure or crack is substantially tapered in cross-section profile from a relatively wider gap at or towards the opening in the edge 58 of the trench to a relatively narrow gap at the blind end of the crack or fissure in the body of the soil profile, depending on the nature and condition of the soil. The lifting of the granules out of the trench, depositing the granules along the edges of the trench and the formation of the fissures at the sides of the trench are all illustrated schematically in FIG. 9.

It is to be noted that the more open structure of the soil adjacent the edges of the trench and the aerated granules within the trench promote improved growth of plants or seeds in the trench and in close proximity to the trench because of the increased access of air, particularly oxygen to the roots of the plants located within the soil, including existing plants and newly planted plants such as plants developing from seeds lodged within the trench.

Operation of the tilling apparatus 20 therefore promotes improved growth and health of plants located within the trench and immediately adjacent the edges of the trench by providing increased access to nutrients within the soil close to the plants and increased access to oxygen which are allowed to penetrate into and within the trench and to the soil immediately adjacent the trench having the cracks or fissures. It is to be noted that the aerated structure of the soil promotes green manure cropping with its attendant benefits both within the trench and between the trenches.

It is to be noted that the depth of the trench can extend from about 10 mm to about 2000 mm with a depth of about 100 mm being typical.

Further, it is to be noted that the width of the trench can be from about 2 mm to about 600 mm wide, with typical widths being in the range from about 25 mm to 250 mm, and preferably widths of about from 75 mm to 150 mm.

Furthermore, it is to be noted that distance between the centrelines of adjacent trenches can be from about 100 mm to about 3000 mm with typical widths being about from 200 mm to about 2000 mm, and preferably widths of about 250 mm to about 1500 mm, with widths of about 450 mm being usual.

A further embodiment of the tilling apparatus will now be described with reference to FIGS. 10 and 10A which illustrate a form of the tilling apparatus as previously described but with one form of an additional component or subassembly in the form of a seeder, generally denoted as 70, mounted or otherwise connected to the top of the tilling apparatus, such as, for example, fixedly connected to the front transverse frame 24, or front and rear transverse frame members 24, 26 of tilling apparatus 20.

In one form, seeder 70 comprises a generally rectangular framework arrangement 72 comprising a transversely extending frame member 74, a longitudinally extending frame member 76, and a number of upwardly extending frame members 78a, 78b, 78c so as to form a box-like structure having open sides.

A hopper 80, is provided at or towards the top of open framework arrangement 72 for storing seeds of desired crops or plants being sown using tilling apparatus 20, optionally with other additives, such as for example, fertilisers, nutrients, growth enhancers, or the like, since a range of different plants can be sown simultaneously from a mixture of seeds. Hopper 80 is provided with a pair of oppositely inclined sloping walls 82a, 82b along which seed deposited in hopper 80 can slide in a downwards direction. A slot 84, or chute or similar, is provided intermediate the two oppositely inclined sliding walls 82a, 82b along the lower surface or base of hopper 80. In one form, slot 84 extends transversely from one longitudinal side of hopper 80 to the other longitudinal side, whereas in other forms, the slot is a chute or similar. The opening of intermediate slot 84 allows individual seeds to fall through the slot intermediate the sloping walls so as to be delivered from hopper 80 into a distributor 86 located underneath hopper 80.

Distributor 86 is located immediately below slot 84. In one form, distributor 86 is provided with four individual chutes 90 forming four individual pathways for seeds to travel along after being received from slot 84. Individual chutes 90 are formed from divider walls 92 located in spaced apart relationship to one another to define the four pathways. A movable conveyor belt 94 in the form of an endless loop, having a width approximating the width of the seeder and accordingly, the four individual pathways is arranged to rotate immediately beneath distributor 86 to convey seed received through slot 84 to distributor 86 by moving the seed along the four chutes 90 forming the four individual pathways of the distributor. The direction of movement of conveyor belt 93 is shown by arrows B of FIG. 10.

Each individual pathway formed by divider walls 92, is provided with a generally perpendicular discharge portion 94 in fluid communication with the pathways respectively. An intermediate conduit, typically in the form of a cylindrical hollow tube 96 is connected at one end to discharge portion 94 of each pathway for receiving seed deposited onto the pathway by hopper 80. One end of a flexible hose 98 is fixedly connected to downstream end of discharge tube 96 and is arranged to be mounted on apparatus 20, such as for example on flap 16, so as to form a delivery pipe for seed directed into this pathway by distributor 86. Each of the four individual pathways is provided with a dedicated flexible hose 98 so that there are four flexible hoses 98 spanning the width of tilling apparatus 20, particularly the width of flap 16.

It is to be noted that any number of flexible hoses 98 can be provided depending upon the width and size of tilling apparatus 16. Further, it is to be noted that the number of delivery hoses 98 corresponds to the number of trenches formed by the tilling apparatus so that a mixture of seeds is deposited in and along the margins of each respective trench.

The other end of each flexible hose 98 is provided with an outlet, in the form of a drop tube 100 or fitting through which seed conveyed through flexible hose 98 is passed so as to be deposited within the corresponding trench 54 being formed by the respective blades 44 as tilling apparatus 20 moves forward over the surface of land 50. Thus, in this embodiment, the soil is tilled and/or cultivated immediately prior to seed and/or fertiliser being planted within the trench so as to reduce the number of passes machinery must make over the surface of the land to cultivate the land, including planting of seed and/or fertiliser so as to further reduce compaction of the soil. This assists in low-till working of the soil by requiring a single pass only.

In this embodiment, conveyor 94 is driven by a transmission connected to the gearbox or other parts of tilling apparatus 20 so as to rotate as the tilling apparatus is in operation. In one form, the speed of rotation of conveyor belt 94 as shown more particularly in FIG. 10, is independent of the speed of rotation of the tilling apparatus, whereas in other forms, the speeds of the conveyor and apparatus correspond to one another. In one form, the engine speed determines the speed of movement via the power take off, whereas in other forms, the speed of movement is determined by the ground speed of the tilling apparatus, or rather the speed of the ground wheels of the apparatus. In still other forms, the speed of the conveyor is determined by the speed provided by an adjustable speed electric motor dedicated to driving the conveyor.

It is to be noted that the tilling apparatus in whatever form or configuration it is used, can be employed to rejuvenate any type of soil or pasture. In particular, the apparatus can be applied to pasture, to cropping, to over sowing existing pasture or barren ground. The soil in whatever form it is treated, can be conditioned to improve the soil.

It is to be noted that other forms of the planter are possible.

In a still further embodiment of the present invention, the tilling apparatus includes further components for treating and/or cultivating the soil. In one form, such as the embodiment illustrated in FIG. 11, the combined apparatus which is generally denoted as 110, comprises a coulter cutter 112 located immediately after and adjacent to tractor 2 for cutting or mulching stubble or vegetation growing on the surface of soil which is about to be cultivated and/or worked so as to reduce the chances that vegetation will collect around tilling apparatus 110 which could prevent tilling apparatus 110, or any of the individual components of the combination of components of a particular tilling apparatus 110 from working correctly or efficiently thereby resulting in inefficient operation of the tilling apparatus. Thus, coulter cutter 112 reduces the length of vegetation immediately prior to be cultivated by cutting or shredding the vegetation.

Immediately behind coulter cutter 112 is a ripper 114, or similar, such as for example a spade or chisel head plough, or the like for forming a preliminary cut or groove in the surface of soil 50 in preparation for forming trench 54. In one form, ripper 114 is used to increase the depth of trench 54 by forming a channel of narrower width then trench 54 prior to the formation of the trench, but at a depth that is greater than the depth of trench 54 so that the bottom of trench 54 is a narrow channel or slot extending further into the subsoil or soil profile than is the usual depth of the trench.

Figure 11:
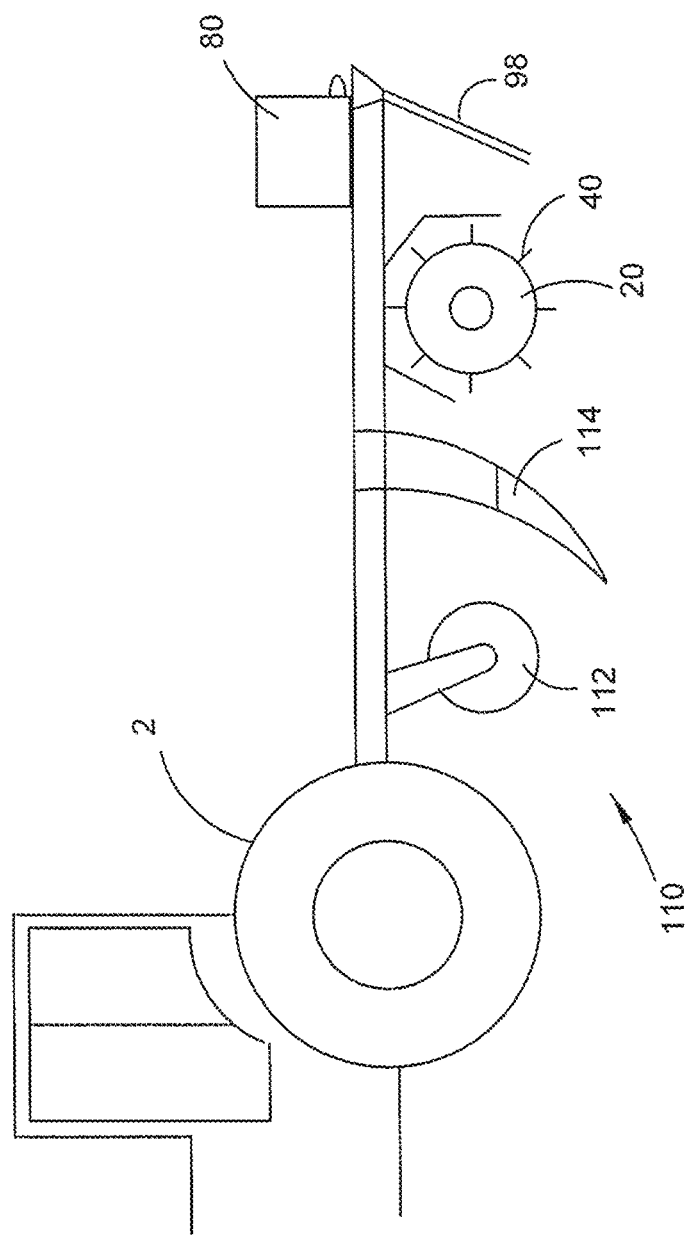
FIG. 11 is a schematic view of another embodiment of the tilling apparatus suitable for low pass tilling showing one combination of different implements.

Ripper 114 or chisel plough can have any suitable or desirable shape or configuration or size. Although one configuration is shown in FIG. 11, in which ripper 114 is curved forwardly, in other configurations ripper 114 is curved rearwardly. However, it is to be noted that the width of the cutting or ripping element of ripper 114 can be greater or less than, usually less than, the corresponding width and/or diameter of disc 34 and tines 40, particularly of the alternately oriented blades 42, so that a preliminary groove or cut formed by ripper 114 is located in alignment with corresponding disc 34 and tine 40 arrangement of tilling apparatus 20 so as to form a generally deeper but narrower cut immediately preceding the formation of the trench, but in the same location to assist tines 40 in being able to form trench 54 particularly to allow blades 44 to contact the soil in order to form trench 54 with granulated soil and fissures at the side of the trench as described previously in alignment with the preliminary cut or groove. In one form, ripper 114 could be located in between adjacent rotating rotor discs 34.

Immediately behind ripper 114, is located tilling apparatus 20 having a multitude of rotary discs 34 and tines 40 arrangements for forming the trench as described previously.

Optionally, the tilling apparatus has a seeder 80 located at or towards the rear of the tilling apparatus to plant seed and/or apply fertiliser simultaneously as the tractor moves forward.

Use of this form of tilling apparatus 110 results in low till of the soil by reducing the number of separate passes of the tractor and other farm machinery over the same stretch or tract of land thereby reducing the amount of compaction of the soil and allowing increased amount of aeration to be formed by the tines when cutting the trench and forming the fissures at the side of the trench.

Figure 13:
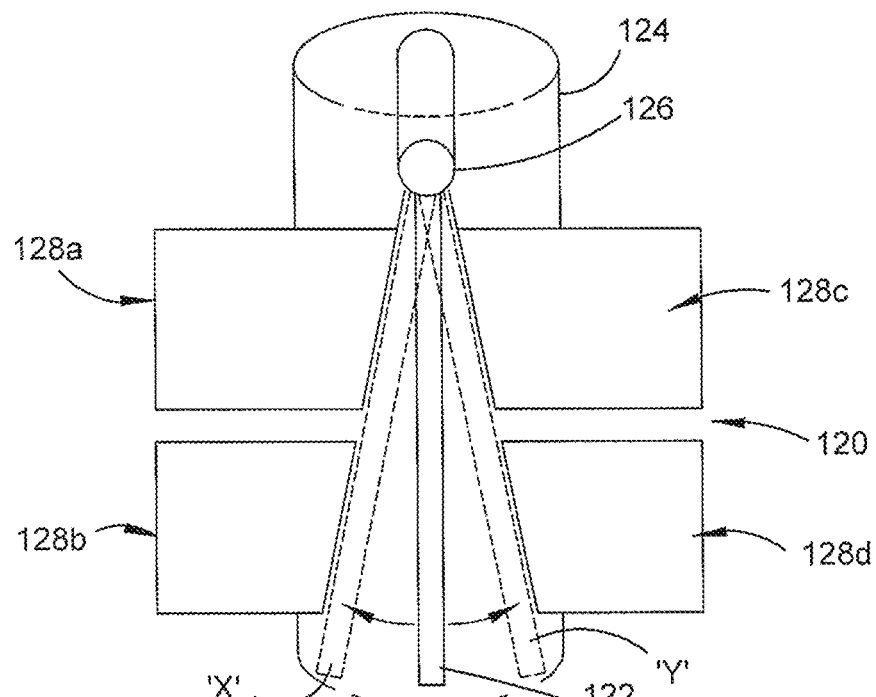
FIG. 13 is a schematic side view of one form of a deflector valve for controlling a flow of air to the respective delivery hoses of the planter for planting seeds.

The seeder section of the tilling apparatus is optionally provided with a valve or deflector for metering the distribution of air and/or seed and/or fertiliser to one or more of the delivery hoses for planting the seed and/or fertiliser mixture so as to achieve a more or less uniform distribution of the mixture into each of the trenches. With particular reference to FIG. 13, in one form, the valve is a pendulum valve, generally denoted as 120, or similar, for use when the tilling apparatus traverses uneven ground. Alternatively, the valve could be a hinged valve having a hinged deflector, more typically, a weighted hinged deflector or be a weighted deflector that is pivotally mounted for swinging movement from side to side. In one form, the seed mixture is pneumatically conveyed from the individual pathways of the conveyor into each respective delivery hose by a stream of air formed by an electrically controlled fan and motor combination in the form of a blower, typically a low cost 12 volt blower for ease of operation. As the apparatus traverses uneven ground, one side will be at a higher level than the other, particularly as the apparatus crosses contours or travels along contours of a field or paddock being worked. As one side of the apparatus raises, the pendulum valve 122 will swing to the opposite side of plenum chamber 124 or similar as shown in position "X" of FIG. 13, to restrict the flow to the exits 128a, 128b located on that side, i.e. the lower side, of the apparatus due to the pendulum valve being pivotally mounted about pivot 126, whilst simultaneously opening the exits 128c, 128d of plenum chamber 124 leading to the upper side hoses in order to even out the flow of seed mixture to all delivery hoses in an attempt to have a uniform flow of seed mixture in all of the separate delivery hoses despite the orientation of the tilling apparatus. Alternatively, if the other side of the apparatus raises, the pendulum valve will swing to the other side denoted as position "Y" in which exits 128a, 128b are opened more and exits 128c, 128d are restricted.

Figure 12:
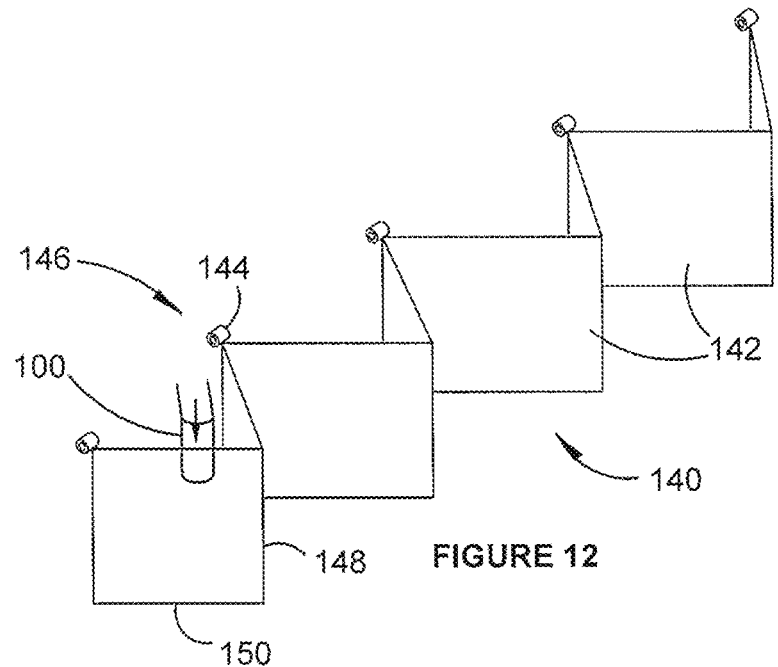
FIG. 12 is a schematic top perspective view of one form of a spreader for spreading and/or levelling the granulated soil after planting.

One form of a spreader that is optionally included as another component of the combination of components of the tilling apparatus will now be described with reference to FIG. 12 which shows the spreader in the form of a smudger, generally denoted as 140, having a multitude of panels 142 fixedly angularly inclined to one another to form a generally boustrophedonic shape or generally zig-zag shape in which adjacent panels extend in opposite directions about drop pipe 100. A hinge 144 is located at the inboard end 146 of the junction of two adjacent panels to connect smudger 140 to the hinges 18, of the tilling apparatus in place of flap 16 which is substituted by smudger 140. Tubes 100 at the distal end of delivery hoses 98 are located at or towards the internal apexes 148 of the outboard junctions to plant the seed mixture in the respective trenches so that as tractor 2 travels further, the lower edges 150 of each of panels 142 of smudger 140 spreads the granulated soil within trench 54 over the seed mixture or spreads the granular particles of soil from the margins of the trench along the edges of the trench and/or into the trench.

In one form, the tilling apparatus smudger 140, replaces flap 16 whereas in another form, smudger 140 is located at or towards the rear of the tilling apparatus in addition to flap 16 remaining in place such that smudger 140 is located outboard of flap 16 towards the rear of the tilling apparatus.

Figure 14:
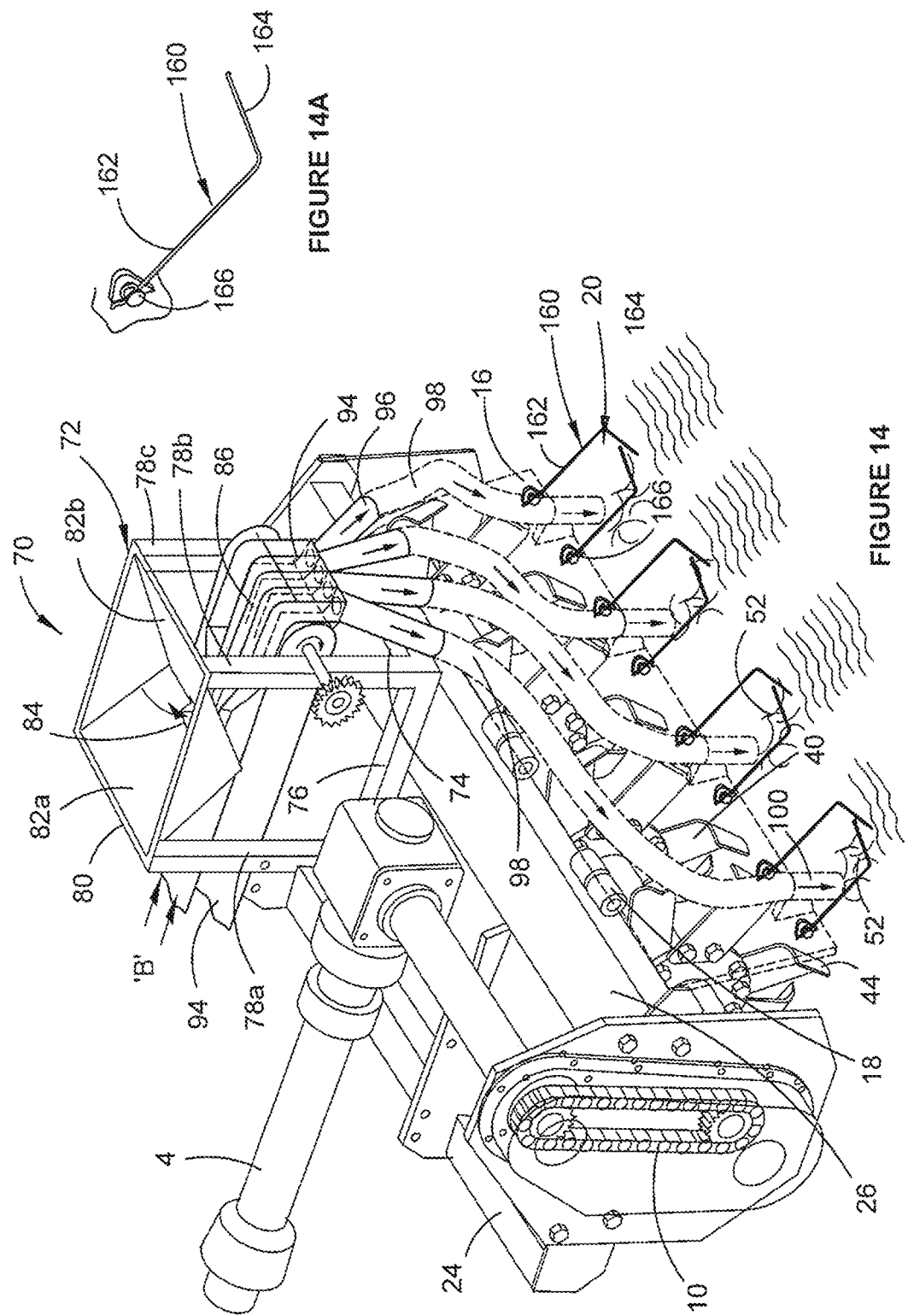
FIG. 14 is a rear perspective view of another form of the tilling apparatus having a seeder and a leveller for levelling soil after passage of the tilling apparatus.
Figure 15:
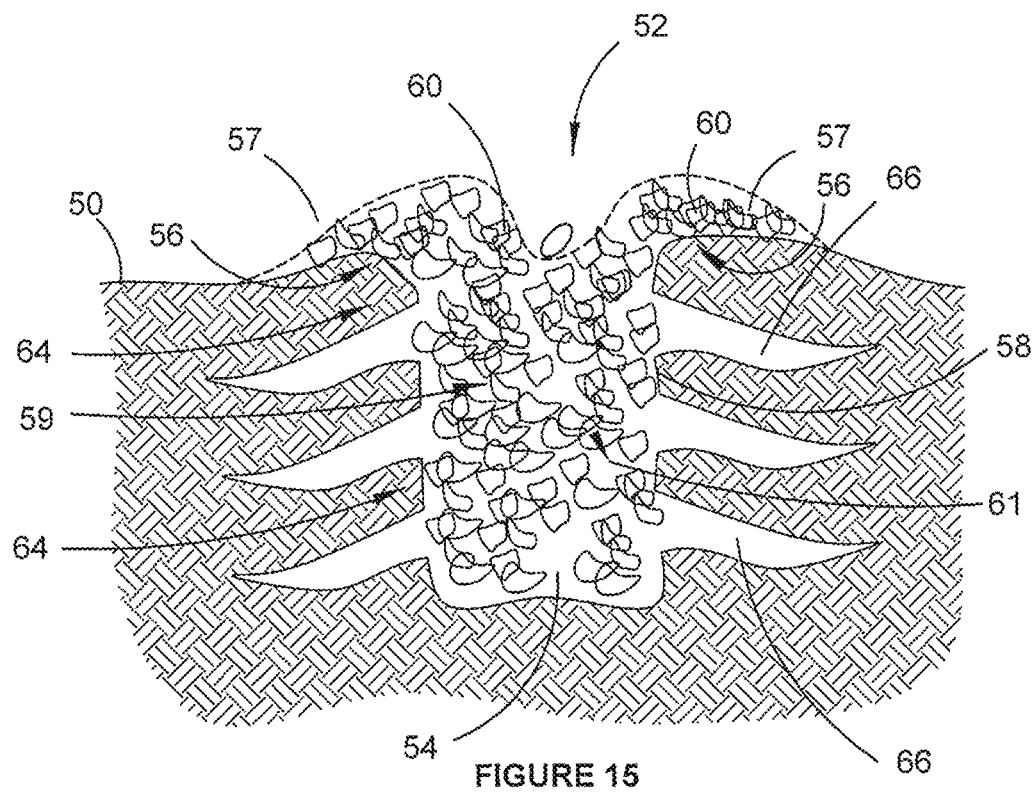
FIG. 15 is a schematic cross-sectional view of another form of a row before passage of the leveller over the top of the row.
Figure 16:
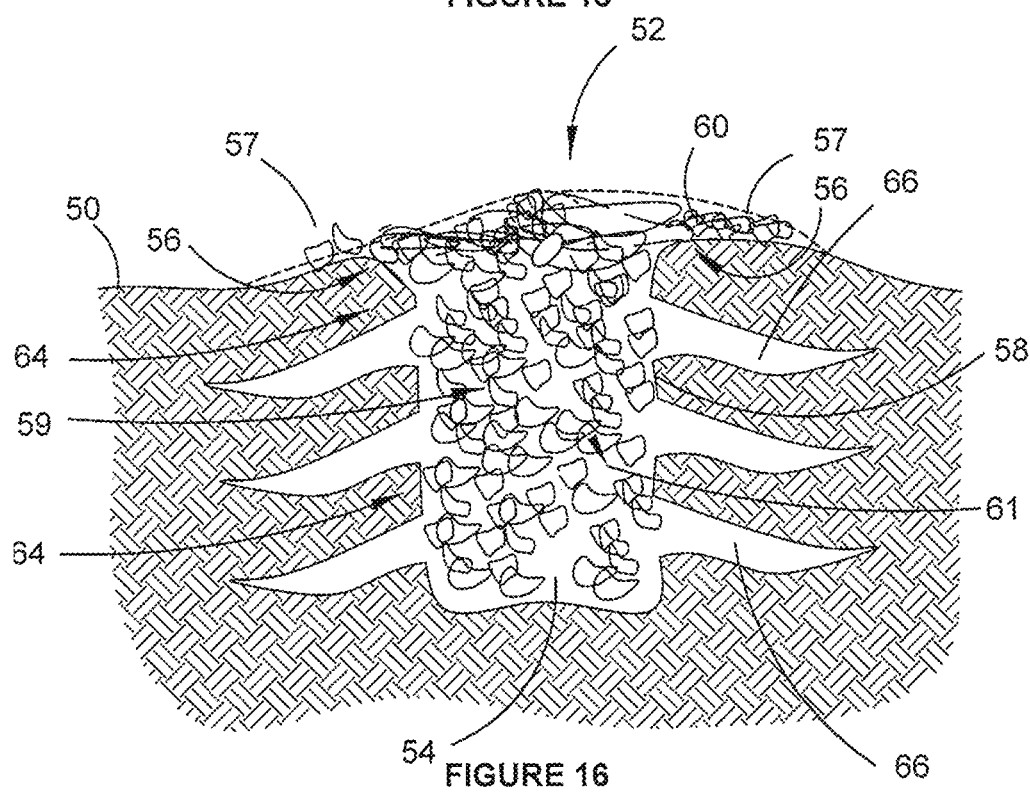
FIG. 16 is a schematic cross-sectional view of the row of FIG. 15 after passage of the leveller showing granulated soil particles returned to the trench.

Other optional forms of the tilling apparatus include the following:

In the embodiment of the tilling apparatus shown in FIG. 14, the apparatus 20 is provided with a leveller or similar in the form of ridge forming bar or similar, 160, for levelling the edges of trench 54 to reduce the height of the soil deposited on the apron to the trench and/or to fill in trench 54 so that the row of worked soil is substantially even over the area of the worked portion of soil by passage of tilling apparatus 20. In one form, leveller 160 is of a generally bent rod configuration having a first substantially straight portion 162 pivotally connected to the outside surface of flap 16 or of the shroud or housing optionally located at the rear of the tilling apparatus by a pivot connector 166 allowing leveller 160 to move up and down over the surface of the worked soil. In one form, the pivot connector provides a spring loaded connector so that each leveller 160 is capable of independent up and down movement which is biased downwards as the tilling apparatus moves forward. A second substantially straight portion 164 is located to extend transversely to first portion 162, typically about perpendicularly to the first portion 162. Second portion 164 is in contact with the soil so that movement of the second portion over the surface of the soil spreads the soil to level the soil and to push soil into the top of the trench after the seeds have been planted, as shown more particularly in FIG. 16. It is to be noted that levellers 160 are arranged in pairs on either side of drop pipe 100 in opposed face-to-face relationship with the respective second portions 164 directed towards one another.

Another component that can be provided optionally on tilling apparatus 20 is a shear or similar for protecting the rotating blades 44 against contact with a solid foreign object such as for example, a buried rock 168 or the like as the apparatus moves over the surface of the ground in operation. The purpose or function of the shear is to strike the rock in preference to the rotating blades to lift the apparatus including the rotating blades over rock 168 thereby preventing contact between the rock and the blades.

One form of the shear and its operation is illustrated in FIGS. 17 to 19 and will now be described.

Shear, generally denoted as 170, includes a generally arcuate member 172 extending in an arc from being fixedly connected at one end to front transverse member 24 in front of rotating cutter 40 at one end to being fixedly connected to downwardly depending strut 174 located at or towards the rear of rotating shaft 32 and cutters 40. It is to be noted that shear 170 has a thin cross-section and a sharpened leading edge 173 so as to cut through the soil ahead of rotating cutters so as to form a groove in the soil. As the shear 170 is located directly in front of and in alignment with disc 34, shear 170 clears a path for the rotating blades located immediately rearward thereof. A flute arrangement 176 in the form of individual flutes 178a, 178b are provided on either side of the rear end of shear 170 to guide movement of shear 170 through the soil to cut the groove in front of cutters 40 by applying a downwardly directed force to shear 170 so as to maintain shear 270 beneath the surface of the soil so as to provide protection for blades 44. It is to be noted flutes 178a, 178b also lift and aerate the soil at a lower level than the trench formed by blades 44 so that aeration of the soil can occur at a level which is deeper than the floor of the trench.

During operation of the tilling apparatus, if there is a buried rock or similar in the path of one of the cutters, because individual shears 170 are located forwardly and in alignment of each of the respective cutters, the front edge of shear 170 contacts the rock to force shear 170 in an upwards direction as indicated by arrows "C" of FIG. 19 as the apparatus moves forward thereby lifting the apparatus over the rock so that the rotating blades of the cutter are clear of rock 168 thereby avoiding damage to the blades. It is to be noted that there is a shear 170 located forwardly and in alignment with each of the rotating cutters 40 as shown more particularly in FIG. 17. Shears 170 are located in spaced apart relationship over the width of apparatus 20 in which the spacing corresponds to the spacing of cutters 40 on shaft 32 so that every cutter is protected by a shear. Although shear 170 is shown as being a generally arcuate thin cutting blade for forming a groove in the soil ahead of cutters, shear 170 can have any suitable or convenient form which provides protection for the rotating blades in use.

ADVANTAGES OF THE INVENTION

Advantages of the present invention include the following:

The use of forms of the tilling apparatus saves time, saves fuel costs, and increases crop yields and the like.

The soil being worked is aerated which promotes improved pasture increasing yield for farmers.

The various forms of the tilling apparatus of the present invention assist in the physical processes for the formation and/or conversion of soils, chemical and physical processes, such as for example, including weathering, leaching, new mineral formation or similar. In particular, the tilling apparatus rejuvenates the soil by not only physically disturbing the soil to reduce compaction, but also exposing the soil particles to other processes, including chemical processes, such as for example, hydrolysis, oxidation, chelation, leaching or the like, which can take place more efficiently because of the formation of granules of soil. Hydrolysis is enhanced by improved water holding capacity. Oxidation is increased by aeration taking place and exposing some soil and sub soil elements to atmosphere. Chelation increases the amount of minerals or nutrients which can bind to the soil particles to provide for, and/or increase the volume and diversity of plants, micro-organisms and decaying organic matter that not only produces the chelating agents, but also that can be bound by the chelating agents. The amount of leaching is reduced which maintains mineral and nutrient elements in an available form for use by plants by eliminating oxygen deficiency and water logging.

The above chemical reactions, and other chemical reactions for changing rock materials into soil can occur, in addition to other chemical reactions for changing one soil type into another soil type, such as for example, converting a silicate material obtained from weathering of rock material into clay type materials by weathering, such as for example, kaolin materials, including kaolinite. Further examples of weathering processes include hydration/dehydration, biological activity, solubilisation in aqueous solutions, and other beneficial processes.

What is claimed is:

1. A method of reducing compaction through at least one of tilling, cultivating or renovating of soil that has been exposed to passing farm machinery that has at least one ground wheel rotatably coupled thereto, the method comprising:
    configuring a tilling apparatus to be towed by a tractor that makes up at least a portion of the farm machinery, the tilling apparatus comprising:
        a rotatable shaft that is responsive to rotational power provided thereto by the tractor; and
        a plurality of cutters secured to the rotatable shaft and spaced apart from one another along an axial dimension thereof, wherein each of the cutters defines a disc with a plurality of tines secured on opposing surfaces and about the periphery thereof, each of the plurality of tines defining an L-shaped construction with a disc-engaging shank that extends radially outward therefrom to terminate with a blade that extends in a substantially perpendicular direction from the shank, wherein the blades of circumferentially adjacent tines about the disc extend in alternately opposite directions to one another; and
    upon having the tilling apparatus traverse over the soil that is in the path of the at least one ground wheel, using the rotational interaction of the plurality of cutters to comminute the soil through rotational interaction therewith such that an entirety of the reducing compaction of the soil is achieved through the plurality of cutters while a plurality of rows of worked soil are formed in unworked soil at least a portion of which has been compacted by contact with the at least one ground wheel, wherein each of the plurality of rows defines a trench comprising a first granulated soil part and a second granulated soil part such that the first granulated soil part comprises an aerated array of soil particles within each of the trenches while the second granulated soil part forms a deposited layer of aerated soil particles onto a portion of the unworked soil that is present on opposing sides of each of the trenches.

2. A method according to claim 1 in which the tilling apparatus further comprises a leveller to at least one of (a) reduce the height of the second granulated soil part and (b) level the depth of the first granulated soil part by adjusting the amount of comminuted portion of the soil between the first granulated soil part and the second granulated soil part.

3. A method according to claim 1 in which the tilling apparatus further includes a movable flap located adjacent a rear of the tilling apparatus in which the flap is movable between a raised position and the lowered position such that when the flap is in the raised position, the comminuted soil formed by the individual cutters is dispersed substantially as the second granulated soil part, and when the flap is in the lowered position, the comminuted soil is dispersed substantially as the first granulated soil part.

4. A method according to claim 1 in which about 50% of the comminuted soil is deposited as the first granulated soil part and about 50% of the comminuted soil is deposited as the second granulated soil part.

5. A method according to claim 1 in which rotation of the cutters forms openings in at least one sidewall of each of the trenches.

6. A method according to claim 5 in which the openings are in the form of segments.

7. A method according to claim 6 in which the segments are in the form of a multitude of cracks, fissures or elongated cavities formed in at least one side of the trench to assist in aeration of the soil.

8. A method according to claim 7 in which each crack or fissure extends for up to about 150 mm from the edge of the trench and to a width of up to about 6 mm.

9. A method according to claim 7 in which the fissure or crack is substantially tapered in cross-section profile from a relatively wider gap towards the opening in the edge or side wall of the trench to a relatively narrow gap towards or at the blind end of the crack or fissure in a soil profile body.

10. A method according to claim 1 in which the dimensions of each of the trenches include a depth of about 10 mm to about 2000 mm, a width of about 2 mm to about 600 mm, and a distance between the centrelines of adjacent trenches from about 100 mm to about 3000 mm.

11. A method according to claim 10 in which the dimensions of each trench include a depth of about 100 mm, a width in the range of about 25 mm to about 250 mm, and a distance between the centrelines of adjacent trenches from about 200 mm to about 2000 mm.

12. A method according to claim 10 in which the dimensions of each trench include a width of about 75 mm to about 150 mm and the spacing apart of adjacent trenches in the range of about 250 mm to about 1500 mm.

13. A method according to claim 10 in which the spacing apart of adjacent trenches is about 450 mm.

14. A method according to claim 1 in which the speed of rotation of the shaft is in the range from about 100 to about 300 rpm.

15. The method according to claim 1, wherein the tilling apparatus is positioned rearwards of the tractor.

16. The method according to claim 1, wherein a ratio of the width of each instance of the unworked soil relative to the worked soil is between about 1:1 and 4:1.

* * * * *